United States Patent
Sasai et al.

(10) Patent No.: US 10,623,760 B2
(45) Date of Patent: *Apr. 14, 2020

(54) IMAGE CODING METHOD FOR CODING INFORMATION INDICATING CODING SCHEME

(71) Applicant: Sun Patent Trust, New York, NY (US)

(72) Inventors: Hisao Sasai, Osaka (JP); Kengo Terada, Osaka (JP)

(73) Assignee: SUN PATENT TRUST, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/253,672

(22) Filed: Jan. 22, 2019

(65) Prior Publication Data

US 2019/0158864 A1 May 23, 2019

Related U.S. Application Data

(63) Continuation of application No. 14/950,738, filed on Nov. 24, 2015, now Pat. No. 10,230,973, which is a (Continued)

(30) Foreign Application Priority Data

Jun. 5, 2014 (JP) .................. 2014-116966

(51) Int. Cl.
*H04N 19/00* (2014.01)
*H04N 19/46* (2014.01)
*H04N 19/70* (2014.01)

(52) U.S. Cl.
CPC ............. *H04N 19/46* (2014.11); *H04N 19/70* (2014.11)

(58) Field of Classification Search
CPC .............................. H04N 19/70; H04N 19/46
See application file for complete search history.

(56) References Cited

U.S. PATENT DOCUMENTS

| | | | |
|---|---|---|---|
| 2011/0044550 A1* | 2/2011 | Tian | H04N 19/597 382/238 |
| 2014/0301449 A1* | 10/2014 | Oh | H04N 19/176 375/240.03 |
| 2014/0355667 A1* | 12/2014 | Lei | H04N 19/105 375/240.02 |

OTHER PUBLICATIONS

International Search Report of PCT application No. PCT/JP2014/003533 dated Sep. 30, 2014.

(Continued)

*Primary Examiner* — Zhihan Zhou
(74) *Attorney, Agent, or Firm* — Greenblum & Bernstein, P.L.C.

(57) ABSTRACT

Image coding and decoding methods are provided. A first flag indicates whether a predetermined extension standard of a predetermined image coding standard is used. When the first flag indicates that the extension standard is used, a second flag indicates whether a first scheme is used for coding and decoding a current block included in an image. The first scheme is included in the extension standard. When the first flag indicates that the extension standard is used, a third flag indicates whether a third scheme is used for coding and decoding the image. The third scheme is included in the extension standard. The second flag and the third flag are included in headers of different layers, with the first flag corresponding to each of the second flag and the third flag being included in each of the headers.

8 Claims, 30 Drawing Sheets

Related U.S. Application Data continuation of application No. PCT/JP2014/003533, filed on Jul. 2, 2014.

(60) Provisional application No. 61/843,480, filed on Jul. 8, 2013.

(56) References Cited

OTHER PUBLICATIONS

Ki-Hun Han et al., "Lossless Inter Coding for Advanced 4:4:4 Coding in H.264/MPEG-4 AVC" JVT of ISO/IEC MPEG & ITU-T VCEG 18$^{th}$ Meeting: Thailand , Jan. 16-20, 2006 [JVT-R045].

Matteo Naccari et al., "On support for alpha channel in HEVC" JCT-VC of ITU-T SG16 WP3 and ISO/IEC JTC1/SC 29/WG 11 13$^{th}$ Meeting: KR, Apr. 18-26, 2013 [JCTVC-M0175_r1].

Thomas Wiegand et al., "WD3: Working Draft 3 of High-Efficiency Video Coding" JCT-VC of ITU-T SG16 WP3 and ISO/IEC JTC1/SC29/WG11, 5$^{th}$ Meeting: CH, Mar. 16-23, 2011 [JCTVC-E603].

Benjamin Bross et al., "High Efficiency Video Coding (HEVC) text specification draft 10 (for FDIS & Last Call)" JCT-VC of ITU-T SG16 WP3 and ISO/IEC JTC1/SC 29/WG11 12$^{th}$ Meeting: CH, Jan. 14-23, 2013 [JCTVC-L1003_v34].

David Flynn et al., "High Efficiency Video Coding (HEVC Range Extensions text specification: Draft 3" JCT-VC of ITU-T SG16 WP3 and ISO/IEC JTC 1/SC 29/WG11 13$^{th}$ meeting: KR, Apr. 18-26, 2013 [JCTVC-M1005].

\* cited by examiner

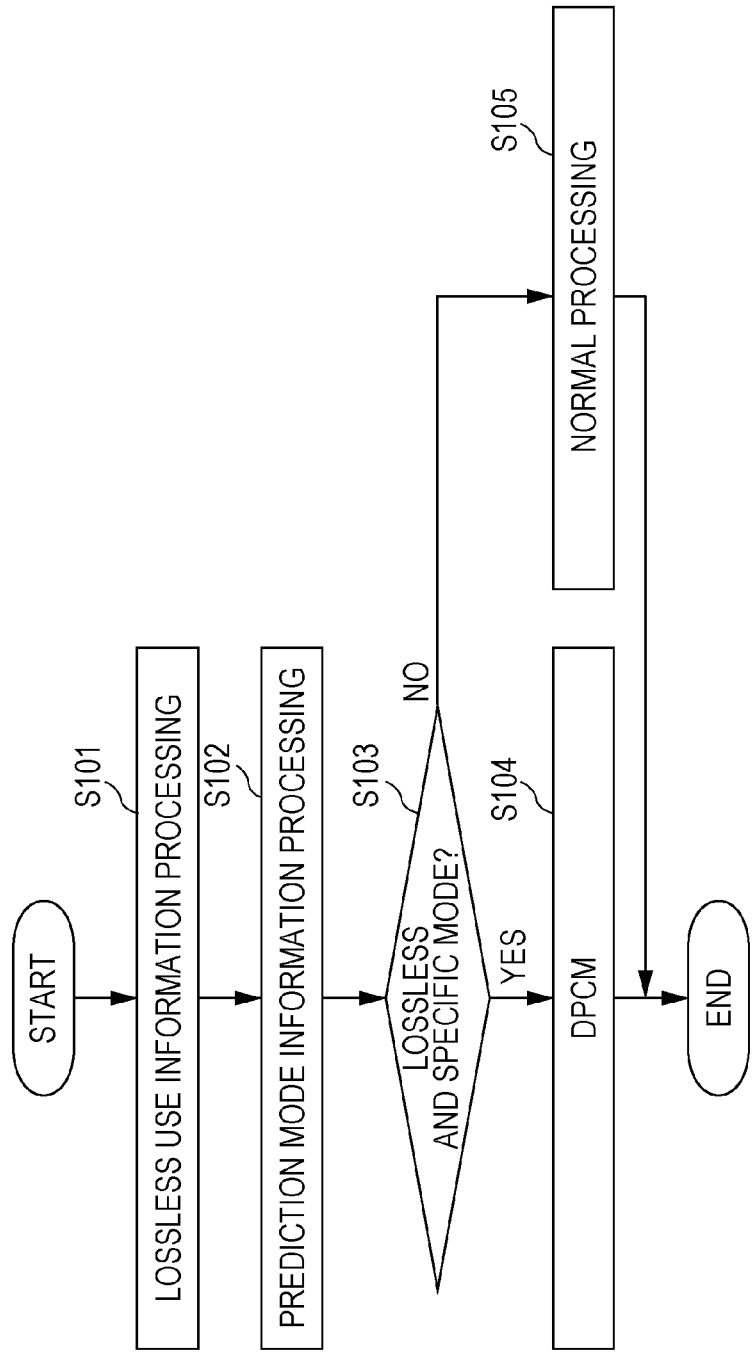

FIG. 2A

| | CONDITION 1 (LOSSLESS AND SPECIFIC MODE) | CONDITION 2 (NORMAL) |
|---|---|---|
| SCHEME 1 (MAIN STANDARD) | PROCESSING A (NORMAL) | PROCESSING A (NORMAL) |
| SCHEME 2 (EXTENSION STANDARD) | PROCESSING B (DPCM) | PROCESSING A (NORMAL) |

FIG. 2B

| | CONDITION 1 (LOSSLESS AND SPECIFIC MODE) | CONDITION 2 (NORMAL) |
|---|---|---|
| SCHEME 1 (MAIN STANDARD) | PROCESSING A (NORMAL) | PROCESSING A (NORMAL) |
| SCHEME 2a (EXTENSION STANDARD + NO LOSSLESS) | PROCESSING A (NORMAL) | PROCESSING A (NORMAL) |
| SCHEME 2b (EXTENSION STANDARD + ALL LOSSLESS) | PROCESSING B (DPCM) | N/A |

FIG. 2C

| | CONDITION 1 (LOSSLESS AND SPECIFIC MODE) | CONDITION 2 (NORMAL) |
|---|---|---|
| SCHEME 1 (MAIN STANDARD) | PROCESSING A (NORMAL) | PROCESSING A (NORMAL) |
| SCHEME 2a (EXTENSION STANDARD + DPCM IS NOT USED) | PROCESSING A (NORMAL) | PROCESSING A (NORMAL) |
| SCHEME 2c (EXTENSION STANDARD + DPCM IS USED) | PROCESSING B (DPCM) | PROCESSING A (NORMAL), PROCESSING C |

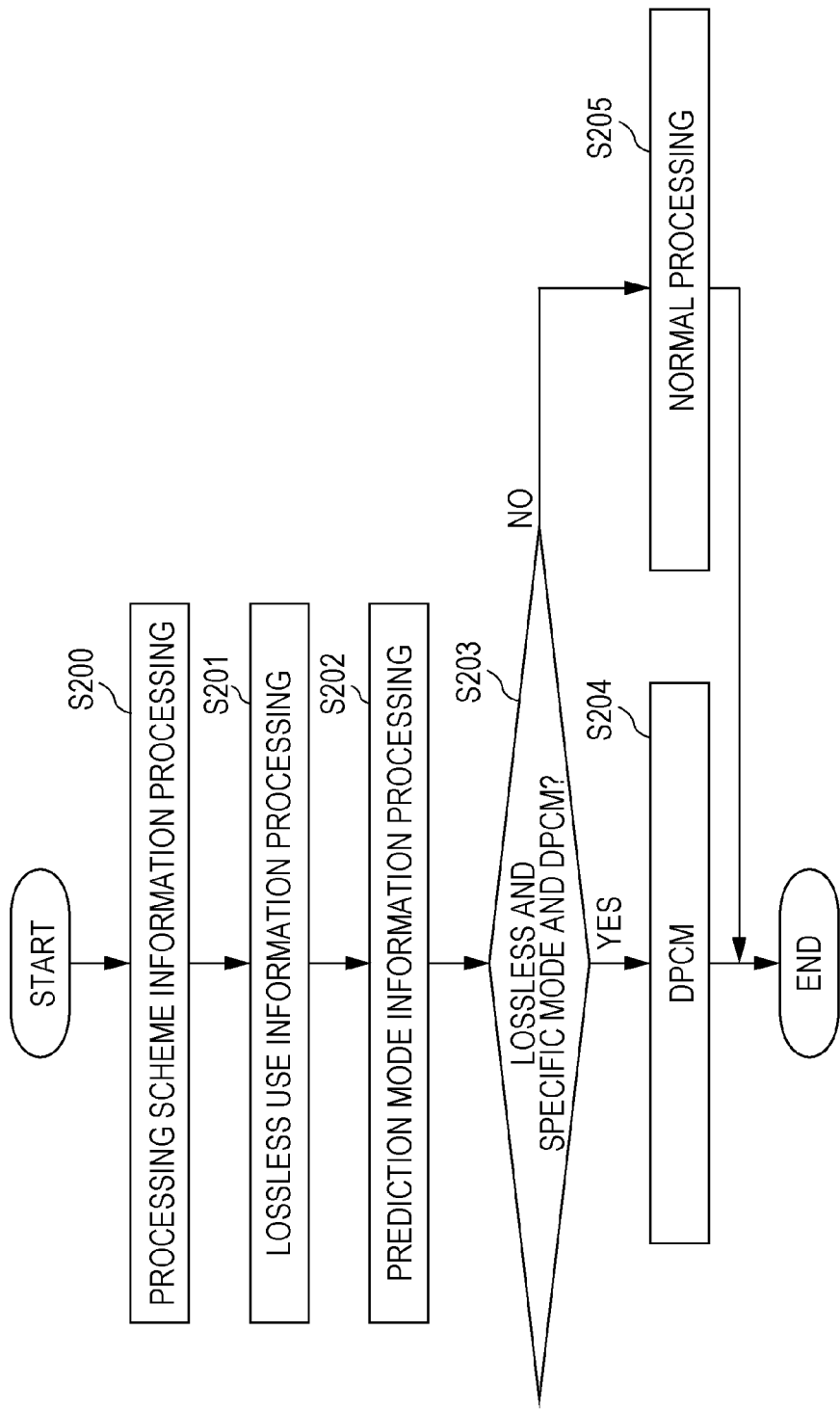

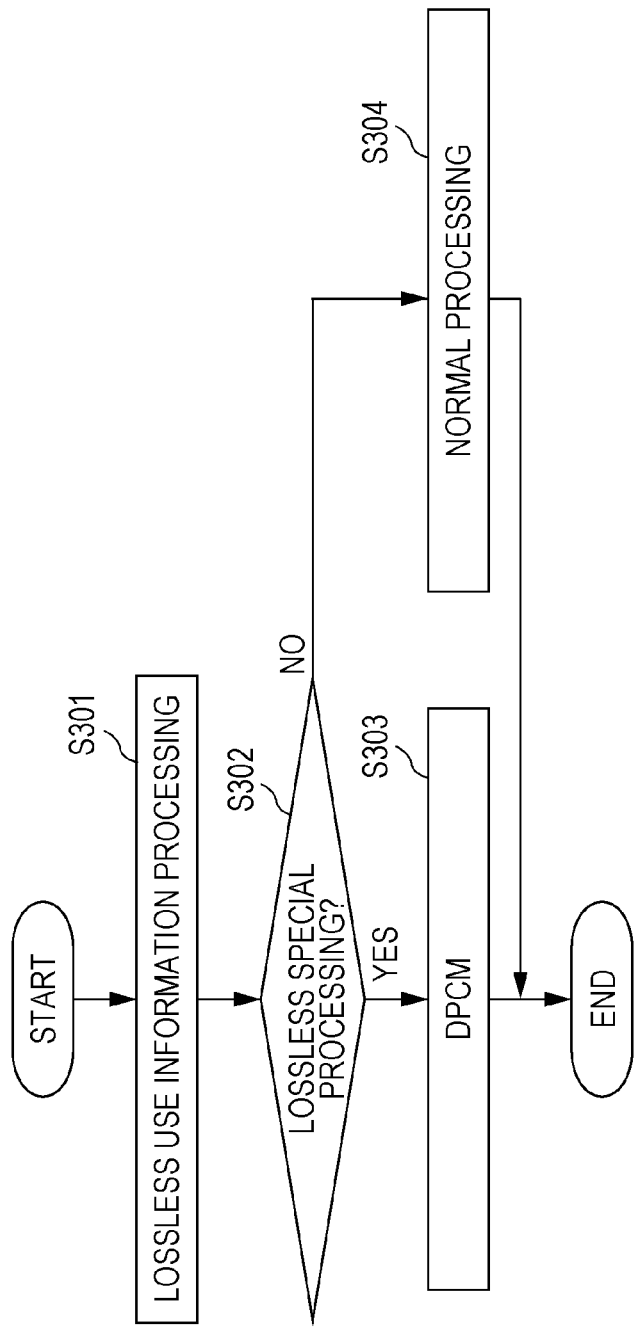

FIG. 6A

| | Descriptor |
|---|---|
| vui_parameters(){ | |
| aspect_ratio_info_present_flag | u(1) |
| ... | |
| lossless_coding_flag | u(1) |

FIG. 6B

| | |
|---|---|
| xxx_extension_flag | u(1) |
| If(xxx_extension_flag){ | |
| ... | |
| lossless_coding_flag | u(1) |

FIG. 6C

| | |
|---|---|
| xxx_extension_flag | u(1) |
| If(xxx_extension_flag){ | |
| ... | |
| Dpcm_use_flag | u(1) |

FIG. 6D

| | |
|---|---|
| xxx_extension_flag | u(1) |
| If(xxx_extension_flag){ | |
| ... | |
| LM_pred_use_flag | u(1) |

FIG. 6E

| | |
|---|---|
| xxx_extension_flag | u(1) |
| If(xxx_extension_flag){ | |
| ... | |
| Mp_tool_flag | u(1) |

FIG. 19

| |
|---|
| VIDEO STREAM (PID = 0x1011 MAIN VIDEO) |
| AUDIO STREAM (PID = 0x1100) |
| AUDIO STREAM (PID = 0x1101) |
| PRESENTATION GRAPHICS STREAM (PID = 0x1200) |
| PRESENTATION GRAPHICS STREAM (PID = 0x1201) |
| INTERACTIVE GRAPHICS STREAM (PID = 0x1400) |
| VIDEO STREAM (PID = 0x1B00 SUB VIDEO) |
| VIDEO STREAM (PID = 0x1B01 SUB VIDEO) |

PMT DATA STRUCTURE

*FIG. 30*

| CONFORMING STANDARD | DRIVING FREQUENCY |
|---|---|
| MPEG4.AVC | 500MHz |
| MPEG2 | 350MHz |
| ... | ... |

IMAGE CODING METHOD FOR CODING INFORMATION INDICATING CODING SCHEME

This is a continuation application of U.S. patent application Ser. No. 14/950,738, filed Nov. 24, 2015, which is a continuation of International Patent Application No. PCT/JP2014/003533, filed Jul. 2, 2014, which claims the benefit of U.S. Provisional Patent Application No. 61/843,480, filed Jul. 8, 2013, and priority to Japanese Application No. 2014-116966, filed Jun. 5, 2014. The disclosures of these documents, including the specifications, drawings, and claims, are incorporated herein by reference in their entirety.

BACKGROUND

1. Technical Field

The present invention relates to an image coding method and image decoding method.

2. Description of the Related Art

Image coding standards represented by an ITU-T standard called H.26x and an ISO/IEC standard called MPEG-x are known. Also, HEVC (High Efficiency Video Coding) is studied as the latest image coding standard (refer to Non-Patent Literature 1).

CITATION LIST

Non-Patent Literatures

Non-Patent Literature 1: Joint Collaborative Team on Video Coding (JCT-VC) of ITU-T SG16 WP3 and ISO/IEC JTC1/SC29/WG16 WP3 and ISO/IEC JTC1/SC29/WG11 12th Meeting: Geneva, CH, 14-23 Jan. 2013, JCTVC-L1003, "High Efficiency Video Coding (HEVC) text specification draft 10 (for FDIS & Last Call)"

Non-Patent Literature 2: Joint Collaborative Team on Video Coding (JCT-VC) of ITU-T SG16 WP3 and ISO/IEC JTC1/SC29/WG11 13th Meeting: Incheon, KR,18-26 Apr. 2013, JCTVC-M1005, "High Efficiency Video Coding (HEVC) Range Extensions text specification: Draft 3"

Non-Patent Literature 3: Joint Collaborative Team on Video Coding (JCT-VC) of ITU-T SG16 WP3 and ISO/IEC JTC1/SC29/WG11, 5th Meeting: Geneva, CH, 16-23 Mar. 2011, JCTVC-E603, "WD3: Working Draft 3 of High-Efficiency Video Coding"

It is desired that an image coding method and image decoding method are capable of decoding a coded signal appropriately.

SUMMARY

One non-limiting and exemplary embodiment provides an image coding method capable of generating a coded signal that can be decoded appropriately, or an image decoding method capable of decoding a coded signal appropriately.

In one general aspect, the techniques disclosed here feature an image coding method for coding an image on a block-by-block basis, the method comprising: a first flag coding step of coding a first flag that indicates whether a predetermined extension standard of a predetermined image coding standard is used; a second flag coding step of coding, when the first flag indicates that the extension standard is used, a second flag that indicates whether a first scheme is used for coding a current block to be coded included in the image, the first scheme being a coding scheme included in the extension standard; a prediction step of performing prediction on the current block to generate a residual signal, the residual signal indicating a difference between the current block and the predicted current block; and a coding step of coding, when the second flag indicates that the first scheme is used, the current block by coding a difference between adjacent-to-each-other samples of the current block using the first scheme, the samples being obtained from the residual signal.

The present invention can provide an image coding method capable of generating a coded signal that can be appropriately decoded, and an image decoding method capable of decoding the coded signal appropriately.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 1 is a diagram illustrating an example of an image coding method;

FIGS. 2A to 2C are diagrams for describing the image coding or decoding method according to a first exemplary embodiment;

FIG. 3 is a flow chart of image coding or decoding processing according to the first exemplary embodiment;

FIG. 4 is a flow chart of image coding or decoding processing according to a variation of the first exemplary embodiment;

FIG. 6A is a diagram illustrating an example of a configuration of a bitstream according to the first exemplary embodiment;

FIG. 6B is a diagram illustrating an example of the configuration of the bitstream according to the first exemplary embodiment;

FIG. 6C is a diagram illustrating an example of the configuration of the bitstream according to the first exemplary embodiment;

FIG. 6D is a diagram illustrating an example of the configuration of the bitstream according to the first exemplary embodiment;

FIG. 6E is a diagram illustrating an example of the configuration of the bitstream according to the first exemplary embodiment;

FIG. 19 is a diagram illustrating a structure of multiplexed data;

FIG. 30 is a diagram illustrating an example of a lookup table in which a video data standard and a driving frequency are associated with each other;

Figure 5:
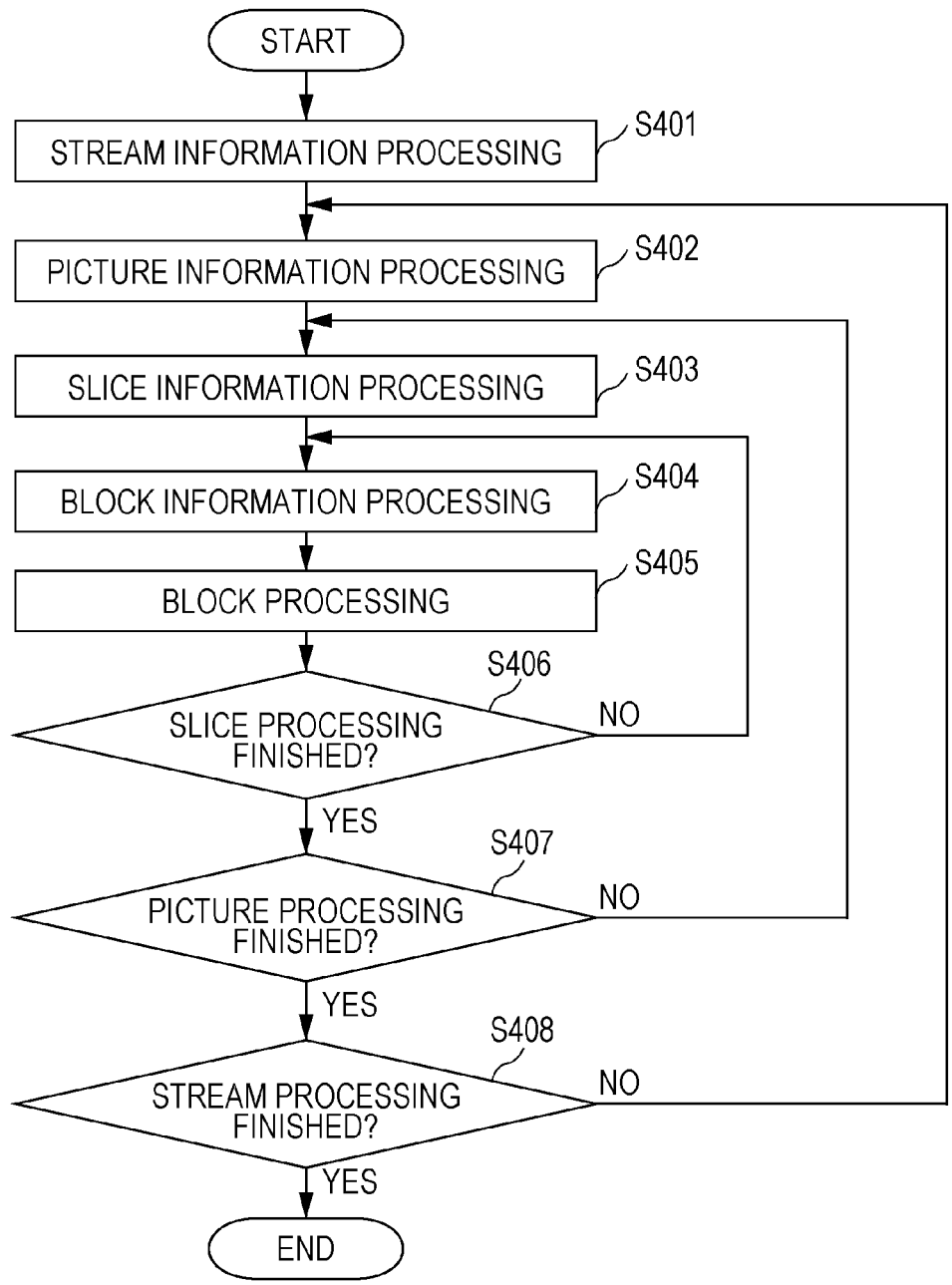
FIG. 5 is a flow chart of coding or decoding processing according to the first exemplary embodiment.

DETAILED DESCRIPTION (Underlying Knowledge of Present Invention)

The present inventor has found out that the following problem occurs regarding the image coding apparatus or image decoding apparatus described in the column of "2. Description of the Related Art".

HEVC can specify lossless coding by which an input signal coincides with a signal after coding and decoding on a block-by-block basis (refer to Non-Patent Literature 1).

In contrast, in a case of a lossless mode, a method for coding (or decoding) processing differs between a main standard (Non-Patent Literature 1) and an extension standard (Non-Patent Literature 2) of HEVC.

FIG. 1 is a flow chart of image coding or decoding processing in the extension standard of HEVC. First, the apparatus determines whether a block to be processed is a lossless block for which the lossless mode is used (S101). Next, the apparatus acquires a prediction mode to be used (S102). When the lossless mode is used and the prediction mode is a specific mode (vertical prediction or horizontal prediction) (Yes in S103), the apparatus uses DPCM (differential pulse-code modulation) processing (S104). DPCM is called differential pulse-code modulation and performs PCM coding on a difference between adjacent samples in the block to be coded. This can easily increase compression efficiency. Generally, the sample is a pixel value such as an unprocessed pixel value or a pixel value after some prediction or transform processing is performed. For example, in image coding processing, a residual signal, which is a difference between an original image and a prediction image, is calculated. In DPCM, a difference between an object element and an element left-adjacent or upper-adjacent to the object element included in the residual signal is coded or decoded. Note that DPCM processing is described in detail in Residual modification process for intra blocks of Non-Patent Literature 2.

On the other hand, in a case other than the above case (No in S103), the apparatus uses normal processing (coding or decoding processing) (S105). Note that normal processing is described in Non-Patent Literatures 1 and 2.

On the other hand, only normal processing (S105) exists and processing to be performed when a condition of step S103 is satisfied is not defined in the main standard of HEVC (Non-Patent Literature 1). Accordingly, there is a problem that it is difficult to standardize circuitry between the main standard and extension standard of HEVC.

Also, a unit in which a profile of the standard (main standard or extension standard) can be switched is a unit called sequence including a plurality of pictures. Accordingly, information that indicates whether a bitstream is compliant with the main standard or extension standard (information that indicates the profile) is included only in header information of the sequence. Therefore, for example, when the image decoding apparatus receives data on a picture-by-picture or slice-by-slice basis, which is finer than the sequence, the image decoding apparatus may perform processing in accordance with a wrong standard. Also, in such a case, it is difficult for the image decoding apparatus to find an error. That is, there is a problem that error determination in the image decoding apparatus is difficult.

Note that the profile is prepared for allowing selective use of a compression scheme suitable for various implementation variations, such as a digital accumulation medium, television broadcasting, and real time communications. In other words, the profile is used for indicating mutual operability in implementation of the image decoding apparatus. That is, the profile indicates an algorithm and restriction which the image decoding apparatus that supports the profile needs to support. For example, the extension standard is, as compared with the main standard, techniques such as a coding technique that increases the compression efficiency while increasing a processing load, or a technique that conversely decreases the processing load by skipping normal processing. Thus, use of various optional functions is allowed through specification of the extension standard. In addition, the extension standard prescribes transmission methods, such as syntax, for implementing the above.

For example, regarding DPCM, it is determined whether processing is performed based on a flag that is sent on a coding unit-by-coding unit basis, which is a unit for coding.

An image coding method according to one aspect of the present invention is an image coding method for coding an image, the method including: a first flag coding step of coding a first flag that indicates whether a predetermined extension standard of a predetermined image coding standard is used; a second flag coding step of coding, when the first flag indicates that the extension standard is used, a second flag that indicates whether a first scheme for coding a difference between adjacent-to-each-other samples included in a residual signal of an current block is used, the first scheme being a coding scheme included in the extension standard; and an image coding step of coding, when the second flag indicates that the first scheme is used, the image by using the first scheme.

Accordingly, the image coding method codes the second flag in addition to the first flag that indicates a difference in the standard. This allows the image decoding apparatus to determine the coding scheme appropriately with reference to the second flag when decoding the coded signal generated by the image coding method. Thus, the image coding method can generate the coded signal that can be decoded appropriately.

For example, in the above second flag coding step, the second flag may be written in a header of sequence, which is a unit including a plurality of pictures.

For example, in the above image coding step, when the second flag indicates that the first scheme is not used, the above image may be coded by using a second scheme for coding the residual signal of the current block, the second scheme being a coding scheme included in the image coding standard.

For example, the image coding method may further include a third flag coding step of coding a third flag that indicates whether a third scheme for predicting a color residual signal from a luminance signal is used, the third scheme being a coding scheme included in the extension standard, wherein, in the image coding step, when the third flag indicates that the third scheme is used, the image may be coded using the third scheme.

For example, in the third flag coding step, the third flag may be written in a header of a picture unit.

Also, an image decoding method according to one aspect of the present invention is an image decoding method for decoding a bitstream obtained through coding of an image, the image decoding method including: a first flag decoding step of decoding, from the bitstream, a first flag that indicates whether a predetermined extension standard of an image coding standard is used; a second flag decoding step of decoding from the bitstream, when the first flag indicates that the extension standard is used, a second flag that indicates whether a first scheme for coding a difference between adjacent-to-each-other samples included in a residual signal of an current block is used, the first scheme being a coding scheme included in the extension standard; and an image decoding step of decoding, from the bitstream, when the second flag indicates that the first method is used, the image by a decoding scheme for decoding a signal coded by the first scheme.

This allows the image decoding method to determine the coding scheme appropriately with reference to the second flag. Thus, the image decoding method can decode the coded signal appropriately.

For example, in the second flag decoding step, the second flag may be decoded from a header of sequence that is a unit including a plurality of pictures included in the bitstream.

For example, in the image decoding step, when the second flag indicates that the first scheme is not used, the image may be decoded from the bitstream by a decoding scheme for decoding a signal coded by a second scheme for coding the residual signal of the current block, the second scheme being a coding scheme included in the image coding standard.

For example, the image decoding method may further include a third flag decoding step of decoding a third flag that indicates whether a third scheme for predicting a color residual signal from a luminance signal is used, the third scheme being a coding scheme included in the extension standard, wherein, in the image decoding step, when the third flag indicates that the third scheme is used, the image may be decoded by a decoding scheme for decoding a signal coded by the third scheme.

For example, in the third flag decoding step, the third flag may be decoded from a header of a picture unit included in the bitstream.

In addition, an image coding apparatus according to one aspect of the present invention is an image coding apparatus configured to code an image, including processing circuitry, and storage accessible from the processing circuitry, the processing circuitry being configured to execute the image coding method by using the storage.

Accordingly, in addition to the first flag that indicates a difference in the standard, the image coding apparatus codes the second flag. This allows the image decoding apparatus to determine, when decoding the coded signal generated by the image coding apparatus, the coding scheme appropriately with reference to the second flag. Thus, the image coding apparatus can generate the coded signal that can be decoded appropriately.

In addition, an image decoding apparatus according to one aspect of the present invention is an image decoding apparatus configured to decode a bitstream obtained by coding an image, including processing circuitry, and storage accessible from the processing circuitry, the processing circuitry being configured to execute the image decoding method by using the storage.

This allows the image decoding apparatus to determine the coding scheme appropriately with reference to the second flag. Thus, the image decoding apparatus can decode the coded signal appropriately.

Note that these general or specific aspects may be implemented using a system, a method, an integrated circuit, a computer program, or a computer-readable recording medium such as a CD-ROM, or using any given combination of a system, a method, an integrated circuit, a computer program, and a computer-readable recording medium.

Hereinafter, exemplary embodiments of the present invention will be described with reference to the drawings.

Note that each of embodiments below describes a specific example of the present invention. Numerical values, shapes, materials, elements, arranged positions and connection forms of the elements, steps, the order of the steps, and the like described in the following embodiments are merely examples, and do not limit the present invention. Also, among elements described in the following embodiments, elements that are not included in an independent claim which represents the highest concept are described as optional elements.

First Exemplary Embodiment

In the present exemplary embodiment, an image coding apparatus outputs appropriate information other than information for identifying a plurality of coding schemes (profiles). This can standardize circuitry. Also, the image coding apparatus can support the plurality of coding schemes.

FIGS. 2A to 2C are diagrams for describing an image coding or decoding method according to the present exemplary embodiment. FIG. 2A is a table illustrating a state of having a problem to be solved by the present invention. In the method illustrated in FIG. 2A, processing for condition 1 and processing for condition 2 differ between scheme 1 and scheme 2. Specifically in scheme 1, processing A is used for both condition 1 and condition 2. In scheme 2, processing differs between condition 1 and condition 2. Specifically, in scheme 2, processing B is used for condition 1, and processing A is used for condition 2.

Here, scheme 1 is, for example, an existing HEVC scheme (main standard), and scheme 2 is an HEVC extension scheme (extension standard). Also, condition 1 is a first case where lossless coding is used and a specific mode is used, whereas condition 2 is a second case (where lossless coding or the specific mode is not used). Note that lossless coding is a coding scheme for skipping transform and quantization processing. In lossless coding, a quantization error does not occur, and thus a decoded image identical to an input image can be obtained. Also, the specific mode is a case where a prediction direction to be used is a specific direction, for example, a case of a vertical direction, a horizontal direction, or an equivalent direction.

Also, processing A is normal processing of the main standard, and is processing that does not use DPCM. That is, a prediction image is generated by a normal prediction method, and a residual signal, which is a difference between the input image and the prediction image, is coded. In addition, the normal prediction method includes 35 prediction methods to be used by in-plane prediction. These 35 prediction methods include prediction in 33 directions, average value (DC) prediction, and planar (Planar) prediction. Also, processing B is DPCM, which is a scheme for coding a difference value of the residual signal of adjacent pixels. Note that details of DPCM are described in Non-Patent Literature 2.

Here, in a conventional method, an image decoding apparatus switches between scheme 1 and scheme 2 in accordance with profile information included in a sequence header. Here, the sequence header is data that is output as a representative value of sequence (unit of a series of videos), and is data to be used in common in sequence.

However, a difference between scheme 1 and scheme 2 is only processing for switching between processing A and processing B in accordance with condition 1 and condition 2. Also, even if information for switching between condition 1 and condition 2 is included in a coded signal, independent information that indicates which of processing A and processing B is to be used is not included. Therefore, the image decoding apparatus needs to refer to the aforementioned profile information.

However, video information (coded signal) is transmitted, for example, using a network. Also, accumulated stream information may be edited and divided. At this time, information in the sequence header may be lost by a network error. Also, this information may be changed by mistake during editing. Even in such a case, if information that indicates which of processing A and processing B will be used exists separately from the profile information, a transmitting apparatus or editing apparatus can detect the error by using the information. Therefore, a video signal including the error is not output.

On the other hand, even if the error is included in the video signal, the error is only difference in which of processing A and processing B will be used, and thus the image decoding apparatus can decode the video signal. However, when an assumption at a time of coding (for example, scheme 1 is used) differs from an assumption at a time of decoding (for example, scheme 2 is used), a video obtained differs from a video assumed at the time of coding. That s, there is a problem that a proper decoded image cannot be obtained.

FIG. 3 is a flow chart of coding processing (or decoding processing) according to the present exemplary embodiment.

In the present exemplary embodiment, like processing illustrated in FIG. 1, a processing scheme (DPCM or normal processing) is not checked when block processing is performed, and the image coding apparatus (or image decoding apparatus) codes (or decodes) processing scheme information that indicates the processing scheme to be used for coding processing (or decoding processing) as illustrated in FIG. 3 (S200). For example, this processing is performed in a layer upper than a block layer, and processing after step S201 is performed on a block-by-block basis.

Thus, the image coding apparatus (or image decoding apparatus) can specify which processing scheme (processing A or processing B) is to be used, for example, only by determining whether the lossless and specific mode is used in the block layer, by outputting (or acquiring) coding scheme information in the layer upper than the block layer. This allows inhibition of the aforementioned error.

Here, steps S201 to S205 are identical to S101 to S105, respectively, except for S203 (S103).

The image coding apparatus (or image decoding apparatus) determines in step S203 whether processing B (DPCM) is used, by referring to the processing scheme information acquired in step S200, in addition to whether the lossless and specific mode is used. Thus, using the processing scheme information eliminates the need that the image coding apparatus (or image decoding apparatus) accesses information that indicates the profile (difference in the coding scheme), and allows the image coding apparatus (or image decoding apparatus) to execute stable coding (or decoding) processing.

Note here that the processing scheme information may include information that indicates whether to make all the blocks lossless. In this case, as illustrated in FIG. 2B, when no block is lossless (in the case of scheme 2a), switching in step S203 becomes unnecessary (always NO), which enables stable processing. When all the blocks are lossless, the processing scheme information further includes information that indicates whether processing A or processing B. Generally, when the lossless mode is used, the lossless mode is used in all data, or on a picture-by-picture basis in many cases. Therefore, the above method is effective.

In addition, as another method, the processing scheme information may also include information that indicates what kind of coding tool is to be utilized. For example, when scheme 2 includes a plurality of coding tools, and as illustrated in FIG. 2C, when the processing scheme information indicates a scheme (scheme 2a) for using a coding tool identical to a coding tool of scheme 1 (for example, DPCM is not used), switching in step S203 becomes unnecessary, which enables stable processing.

In addition, although the above description has described a case where DPCM is used when condition 1 is satisfied, a method similar to the above method is applicable to a processing scheme other than DPCM if the processing scheme is not included in scheme 1 (main standard of HEVC). For example, as another processing scheme, processing of the present exemplary embodiment may be applied to an LM mode (or also called Intra_FromLuma mode), which is a prediction scheme for predicting a color residual signal from a luminance signal. Note that the LM mode is described in detail in Non-Patent Literature 3.

This LM mode, which is not adopted in the main standard of HEVC, is effective in enhancing coding efficiency. Information that indicates whether this LM mode is used may be included in the processing scheme information. This eliminates the need for the image decoding apparatus to refer to the profile information in branching processing according to the processing scheme. In addition, this enables the image coding apparatus to selectively use a tool that enhances the coding efficiency.

In addition, the processing scheme information may also include information that indicates whether to change order of coefficient scan at a time of transform skip. This mode for changing the order of coefficient scan at the time of transform skip, which is not adopted in the main standard of HEVC (scheme 1), is effective in enhancing the coding efficiency. Information that indicates whether this mode is used may be included in the processing scheme information. This eliminates the need for the image decoding apparatus to refer to the profile information in branching processing according to the processing scheme. In addition, this enables the image coding apparatus to selectively use a tool that enhances the coding efficiency.

Here, FIG. 4 illustrates a flow chart of processing in a case of specialized in determination of whether to use the lossless mode. First, the image coding apparatus (or image decoding apparatus) codes (or decodes) information that indicates whether to use the lossless mode (S301). When a condition of lossless special processing is satisfied in which another processing is performed only when the lossless mode is used (Yes in S302), the image coding apparatus (or image decoding apparatus) uses a lossless processing set (for example, a processing set for DPCM) (S303). On the other hand, when the above condition is not satisfied (No in S302), the image coding apparatus (or image decoding apparatus) uses a normal processing set identical to scheme 1 (S304).

As can be seen from a flow of processing, very simple processing can be implemented, which enables reduction in the error.

Also, the present exemplary embodiment outputs (codes), for example, this processing scheme information on a picture-by-picture basis. FIG. 5 is a flow chart illustrating processing of a coding stream (writing or reading). As illustrated in FIG. 5, in the coding stream, sequence information (stream information), picture information, slice information, and block information are processed in this order (S401 to S404 and S406 to S408). Also, prediction processing, transform processing, and quantization processing are included in block processing (S405).

For this reason, it is not a preferable scheme to switch block processing by using the sequence information. Therefore, in stream structure according to the present exemplary embodiment, information that indicates switching of the processing scheme is included in lower order (small unit) than the sequence information. In addition, as another method, information that indicates that the lossless scheme is prohibited is included in high-order information. That is, referring to this information enables determination that processing B is not used in the low order. This can solve the aforementioned problem.

FIG. 6A to FIG. 6E are diagrams each illustrating a structure example of the processing scheme information.

FIG. 6A is a diagram illustrating an example of a case where a flag (lossless_coding_flag) that indicates whether lossless coding is used is coded for a unit (VUI: Video Usability Information) in which video information is put. When this lossless_coding_flag is ON (1), lossless coding is used for all the blocks included in VUI. Also, when this lossless_coding_flag is OFF (0), lossless coding is used for no block included in VUI (the use is prohibited).

FIG. 6B is a diagram illustrating an example of a case where lossless_coding_flag is coded (or decoded) when xxx_extension_flag is ON (1). xxx_extension_flag is a flag that indicates whether to record data structure for extension coding in an xxx unit. That is, xxx_extension_flag indicates whether the extension standard of HEVC is used. Also, when xxx_extension_flag is OFF (0), lossless_coding_flag is not coded (or decoded).

Also, although a meaning of lossless_coding_flag is similar to the above, in this case, lossless_coding_flag indicates whether lossless coding is used for all the coded data included in the xxx unit. Note that xxx_extension_flag is provided on either of a sequence-by-sequence, picture-by-picture, video-by-video, and slice-by-slice basis. xxx is "sps" for a sequence-by-sequence basis, "pps" for a picture-by-picture basis, "vps" for a video-by-video basis, and "slice" for a slice-by-slice basis.

FIG. 6C is a diagram illustrating an example of a case where a flag that indicates whether DPCM is used (Dpcm_use_flag) is used. When Dpcm_use_flag is ON (1), use of DPCM is allowed for all the blocks included in the object unit. Also, when Dpcm_use_flag is OFF (0), DPCM is used for no block included in the object unit (the use is prohibited).

Also, as in the case of FIG. 6B, Dpcm_use_flag is coded (or decoded) only when xxx_extension_flag is ON (1).

FIG. 6D is a diagram illustrating an example of a case where a flag (LM_pred_use_flag) that indicates whether to use a method for estimating a color residual signal from luminance called LM mode is used in prediction processing.

When LM_pred_use_flag is ON (1), use of the LM mode is allowed for all the blocks included in the object unit. On the other hand, when LM_pred_use_flag is OFF (0), the LM mode is used for no block included in the object unit (the use is prohibited).

Also, as is the case with FIG. 6B, LM_pred_use_flag is coded (or decoded) only when xxx_extension_flag is ON (1).

FIG. 6E is a diagram illustrating an example of a case where Mp_tool_flag is used. Mp_tool_flag is a flag that indicates whether to use a processing method identical to an existing coding method (for example, a method called MainProfile or Main10Profile in Non-Patent Literature 1).

Also, as is the case with FIG. 6B, Mp_tool_flag is coded (or decoded) only when xxx_extension_flag is ON (1).

Note that, as described above, these pieces of information are provided on either of a sequence-by-sequence, picture-by-picture, video-by-video, and slice-by-slice basis. In the case of a sequence-by-sequence basis, the processing scheme can be controlled sequence by sequence, which is finer than switching of the coding scheme. Also, these pieces of information are information such as information that indicates the prediction scheme, and are information in connection with a section of block processing. Therefore, reliability of data can be improved by using these pieces of information in addition to the profile information.

In the case of a picture-by-picture basis, using these pieces of information is effective for skipping a frame picture by picture, In the case of a slice-by-slice basis, when parallel processing is performed slice by slice, the image decoding apparatus can acquire these pieces of information as information on the object slice, and thus there is no need for accessing to another piece of data to acquire these pieces of information. Therefore, an amount of processing of the image decoding apparatus can be reduced. In the case of VPS, this data itself has a function of achieving dual-redundancy of data regarding important video information. Therefore, these pieces of information can be transmitted and accumulated separately from the profile information as reliable information, by putting these pieces of information into VPS. This allows inhibition of the error.

Thus, even for a different coding scheme, the present exemplary embodiment allows standardization of processing and thus allows significant reduction in a scale of circuitry. In addition, the present exemplary embodiment allows indication that the prediction scheme differs on a picture-by-picture or finer basis, and thus decoding using a wrong prediction scheme can be inhibited. Therefore, the scheme according to the present exemplary embodiment has extremely high practical effect in an environment where a data group is used in which a plurality of coding schemes is intermingled.

Also, in the coding scheme, since a different scheme can be used only for limited applications among a plurality of coding schemes by limiting a unit to standardize (for example, limiting to lossless coding), standardization of circuitry can be promoted. This can promote reuse of resources.

Thus, the image coding method according to the present exemplary embodiment can generate a code string that facilitates stable processing. Also, the image decoding method according to the present exemplary embodiment can decode the code string generated in such a way. Also, the present exemplary embodiment can reduce a section that conventionally needs a plurality of circuits. Also, the present exemplary embodiment can reduce a decoding processing load. This can implement the image decoding apparatus that supports high-speed calculation at low costs.

Second Exemplary Embodiment

The present exemplary embodiment will describe an example of an image coding apparatus and image decoding apparatus for performing the image coding method and image decoding method described in the first exemplary embodiment. Note that characteristic processing of the present exemplary embodiment is performed by controller 111 and controller 209.

First, a configuration of image coding apparatus 100 according to the present exemplary embodiment will be described.

Figure 7:
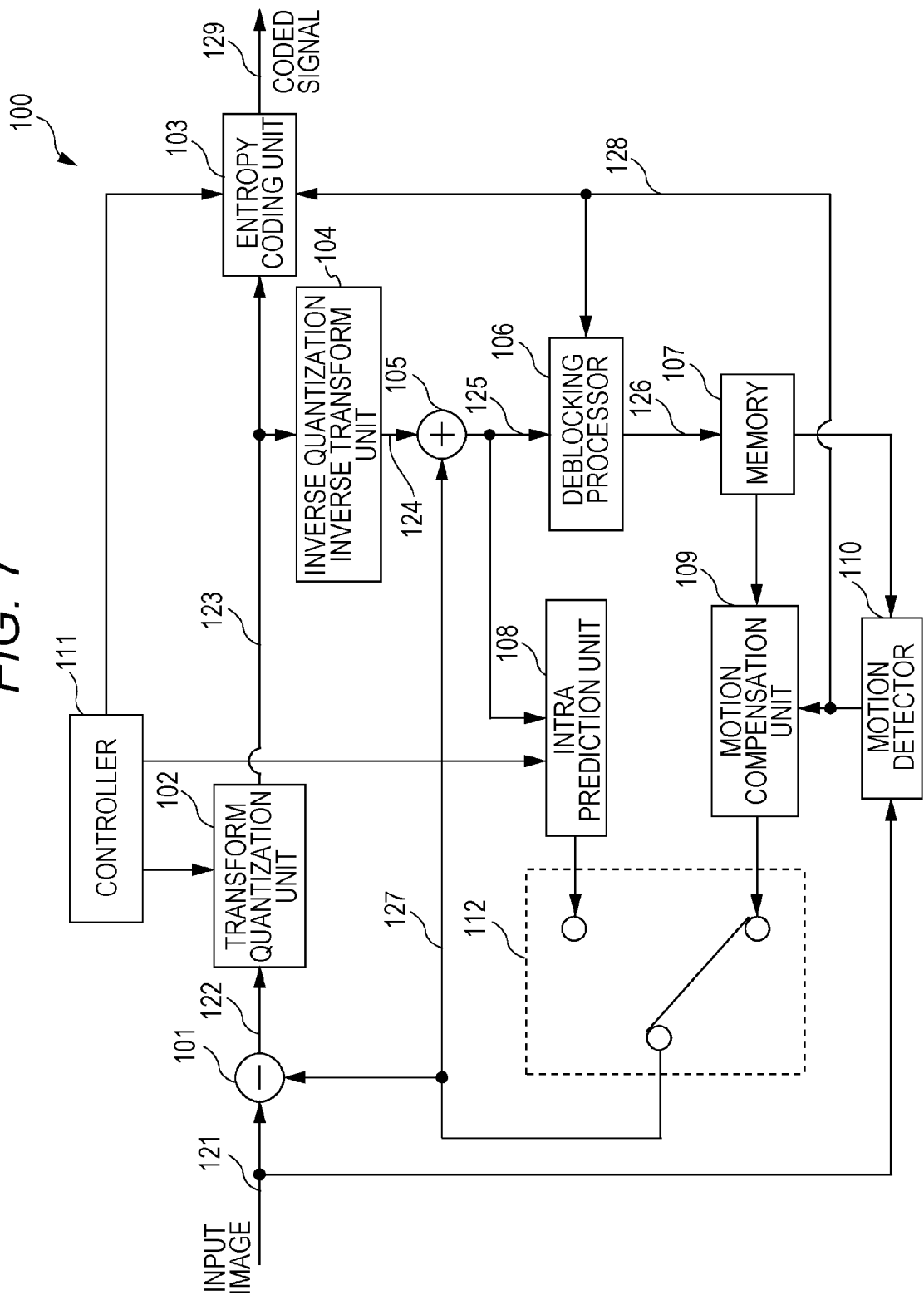
FIG. 7 is a block diagram of an image coding apparatus according to a second exemplary embodiment.

FIG. 7 is a block diagram illustrating an example of the configuration of image coding apparatus 100 according to the present exemplary embodiment.

Image coding apparatus 100 generates coded signal 129 (coded bitstream) by compressing and coding input image 121. For example, input image 121 is input into image coding apparatus 100 on a block-by-block basis. Image coding apparatus 100 generates coded signal 129 by performing transform, quantization, and variable length coding on input image 121 that is input.

Image coding apparatus 100 illustrated in FIG. 7 includes subtracter 101, transform quantization unit 102, entropy coding unit 103, inverse quantization inverse transform unit 104, adder 105, deblocking processor 106, memory 107, intra prediction unit 108, motion compensation unit 109, motion detector 110, controller 111, and selector switch 112.

Subtracter 101 calculates residual signal 122 (also referred to as prediction error or difference signal), which is a difference between input image 121 and prediction signal 127.

Transform quantization unit 102 transforms space-domain residual signal 122 into a frequency-domain transform coefficient. For example, transform quantization unit 102 generates the transform coefficient by performing DCT (Discrete Cosine Transform) transformation on residual signal 122. Furthermore, transform quantization unit 102 generates quantization coefficient 123 by quantizing the transform coefficient.

Entropy coding unit 103 generates coded signal 129 by performing variable length coding on quantization coefficient 123. In addition, entropy coding unit 103 codes motion data 128 (for example, motion vector) detected by motion detector 110, includes the obtained signal in coded signal 129, and outputs the obtained signal.

Inverse quantization inverse transform unit 104 restores the transform coefficient by performing inverse quantization on quantization coefficient 123. Furthermore, inverse quantization inverse transform unit 104 restores residual signal 124 by performing inverse transform on the restored transform coefficient. Note that part of information of restored residual signal 124 is lost by quantization, and thus restored residual signal 124 does not coincide with residual signal 122 generated by subtracter 101. That is, restored residual signal 124 contains a quantization error.

Adder 105 generates local decoded image 125 by adding restored residual signal 124 to prediction signal 127.

Deblocking processor 106 generates local decoded image 126 by performing deblocking filter processing on local decoded image 125.

Memory 107 is a memory for storing a reference image to be used for motion compensation. Specifically, memory 107 stores local decoded image 126 after deblocking filter processing is performed.

Note that in a case of the above-described lossless mode, processing of transform quantization unit 102 and inverse quantization inverse transform unit 104 is skipped, residual signal 122 is input into entropy coding unit 103, and input image 121 is input into memory 107.

Furthermore, when the above-described DPCM is used, a difference in adjacent samples included in residual signal 122 of a current block to be coded is calculated, and entropy coding unit 103 performs variable length coding on the calculated difference.

Intra prediction unit 108 generates the prediction signal (intra prediction signal) by performing intra prediction. Specifically, intra prediction unit 108 generates the intra prediction signal by performing intra prediction with reference to an image around a block to be coded (input image 121) in local decoded image 125 generated by adder 105.

Motion detector 110 detects motion data 128 (for example, motion vector) between input image 121 and the reference image stored in memory 107.

Motion compensation unit 109 generates the prediction signal (inter prediction signal) by performing motion compensation based on detected motion data 128.

Selector switch 112 selects either of the intra prediction signal and inter prediction signal, and outputs the selected signal as prediction signal 127 to subtracter 101 and adder 105.

With the above configuration, image coding apparatus 100 according to the present exemplary embodiment compresses and codes the image data. Here, control of data, lossless processing (skip of transform and quantization processing), and change in the processing mode (such as DPCM), which are characteristic processing of the above-described image coding method according to the first exemplary embodiment, are performed by controller 111.

Next, a configuration of image decoding apparatus 200 according to the present exemplary embodiment will be described.

Figure 8:
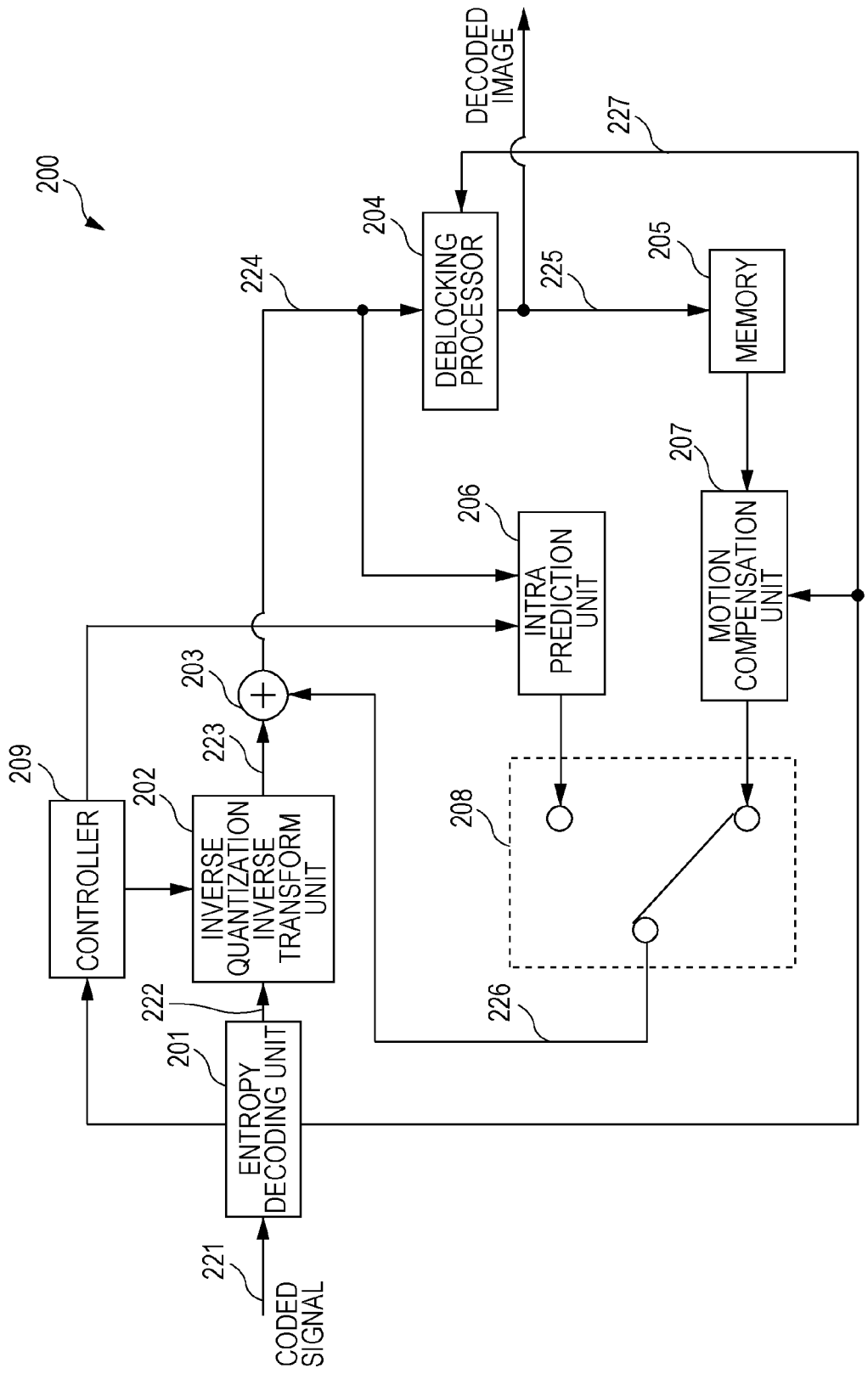
FIG. 8 is a block diagram of an image decoding apparatus according to the second exemplary embodiment.

FIG. 8 is a block diagram illustrating an example of the configuration of image decoding apparatus 200 according to the present exemplary embodiment.

Image decoding apparatus 200 generates decoded image 225 from coded signal 221 obtained through compression and coding of an image. Here, coded signal 221 is, for example, coded signal 129 generated by image coding apparatus 100 described above. For example, coded signal 221 is input into image decoding apparatus 200 as a signal to be decoded on a block-by-block basis. Image decoding apparatus 200 restores decoded image 225 by performing variable length decoding, inverse quantization, and inverse transform on the signal to be decoded that is input.

Image decoding apparatus 200 illustrated in FIG. 8 includes entropy decoding unit 201, inverse quantization inverse transform unit 202, adder 203, deblocking processor 204, memory 205, intra prediction unit 206, motion compensation unit 207, selector switch 208, and controller 209.

Entropy decoding unit 201 restores quantization coefficient 222 by performing variable length decoding on coded signal 221 (coded stream). Here, coded signal 221 (input stream) is a signal to be decoded, and corresponds to data for each block of the coded image data. Also, entropy decoding unit 201 acquires motion data 227 from coded signal 221, and outputs acquired motion data 227 to motion compensation unit 207.

Inverse quantization inverse transform unit 202 restores the transform coefficient by performing inverse quantization on quantization coefficient 222 restored by entropy decoding unit 201. Then, inverse quantization inverse transform unit 202 restores residual signal 223 (also referred to as prediction error or difference signal) by performing inverse transform on the restored transform coefficient.

Adder 203 generates decoded image 224 by adding restored residual signal 223 to prediction signal 226.

Deblocking processor 204 generates decoded image 225 by performing deblocking filter processing on generated decoded image 224. This decoded image 225 after deblocking filter processing is output to outside.

Memory 205 is a memory for storing a reference image to be used for motion compensation. Specifically, memory 205 stores decoded image 225 after deblocking filter processing is performed.

Note that in a case of the above-described lossless mode, entropy decoding unit 201 decodes residual signal 223 from coded signal 221, and processing of inverse quantization inverse transform unit 202 is skipped. In addition, residual signal 223 obtained by entropy decoding unit 201 is input into adder 203.

Furthermore, when the above-described DPCM is used, adjacent samples included in residual signal 223 of the current block are added, and the obtained signal is input into adder 203.

Intra prediction unit 206 generates the prediction signal (intra prediction signal) by performing intra prediction. Specifically, intra prediction unit 206 generates the intra prediction signal by performing intra prediction with reference to an image around a block to be decoded (coded signal 221) in decoded image 224 generated by adder 203.

Motion compensation unit 207 generates the prediction signal (inter prediction signal) by performing motion compensation based on motion data 227 that is output from entropy decoding unit 201.

Selector switch 208 selects either of the intra prediction signal and inter prediction signal, and outputs the selected signal as prediction signal 226 to adder 203.

With the above configuration, image decoding apparatus 200 according to the present exemplary embodiment decodes decoded image 225 from coded signal 221 obtained through compression and coding of the image.

Here, control of data, lossless processing (skip of transform quantization processing), and change processing in the processing mode (such as DPCM), which are characteristic processing of the above-described image decoding method according to the first exemplary embodiment, are performed by controller 209.

Figure 9:
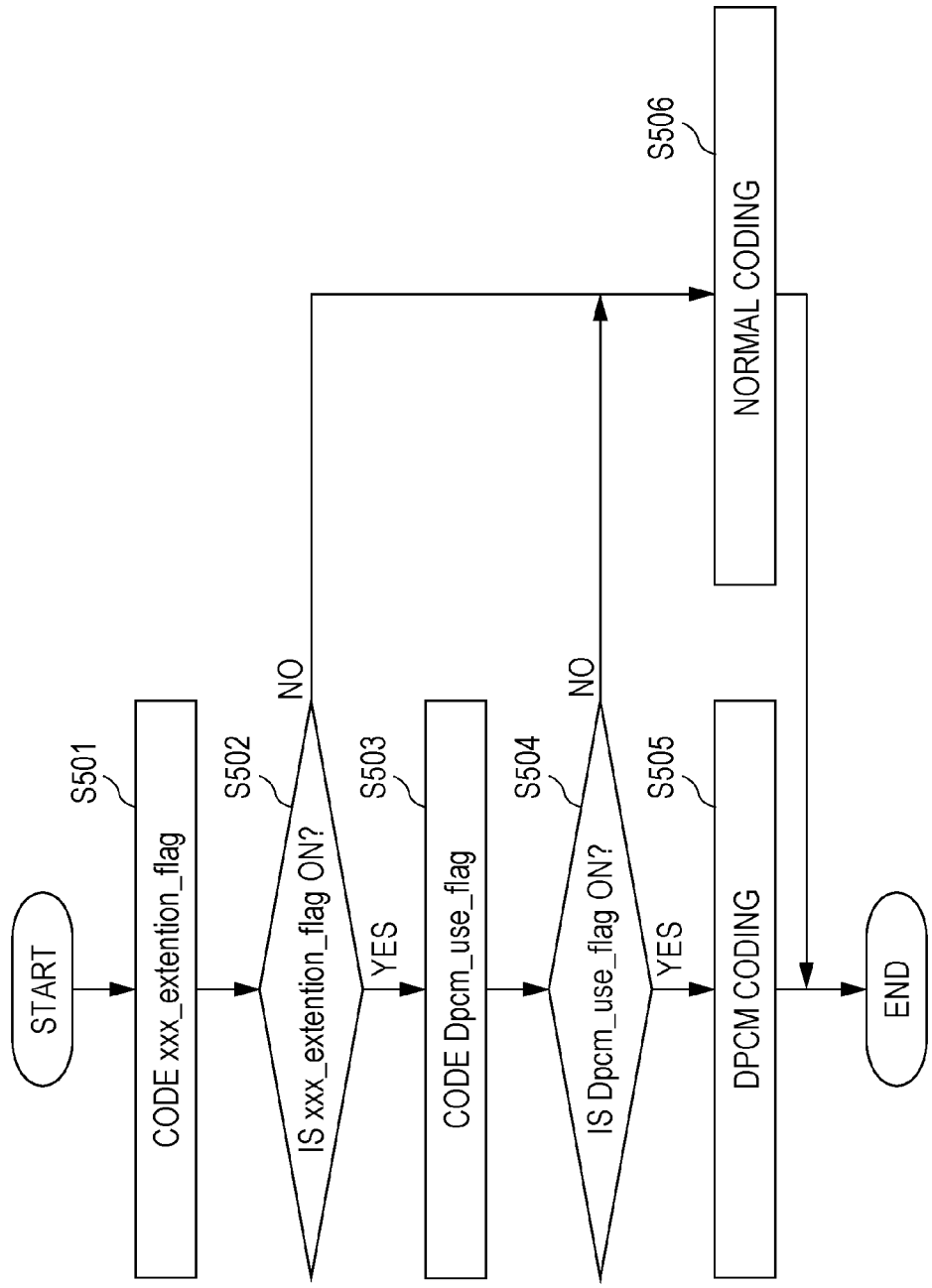
FIG. 9 is a flow chart of the image coding method according to the exemplary embodiments.

As described above, the image coding apparatus according to the present exemplary embodiment performs processing illustrated in FIG. 9.

First, the image coding apparatus codes a first flag (xxx_extention_flag) that indicates whether a predetermined extension standard of a predetermined image coding standard is used (S501). In other words, the first flag indicates a profile of the predetermined image coding standard. That is, the first flag indicates whether a predetermined processing scheme is used.

Next, when the first flag indicates that the extension standard is used (Yes in S502), the image coding apparatus codes a second flag (Dpcm_use_flag) that indicates whether a first scheme (DPCM) for coding the difference between the adjacent-to-each-other samples included in the difference signal (residual signal) of the current block is used, the first scheme being a coding scheme included in the extension standard (S503).

Note that the image coding apparatus writes the first flag and the second flag in either of a header of a sequence unit (unit including a plurality of pictures), a header of a picture unit, a header of a video unit, and a header of a slice unit. For example, the first flag and the second flag are written in an identical header.

When the second flag indicates that the first scheme (DPCM) is used (Yes in S504), the image coding apparatus codes the image by using the first scheme (DPCM) (S505).

On the other hand, when the second flag indicates that the first scheme (DPCM) is not used (No in S504), the image coding apparatus codes the image by using a second scheme (normal scheme) for coding the difference signal of the current block, the second scheme being a coding scheme included in the image coding standard (S506).

Also, when the first flag indicates that the extension standard is not used (No in S502), the image coding apparatus codes the image by using the second scheme (normal scheme) (S506).

Figure 10:
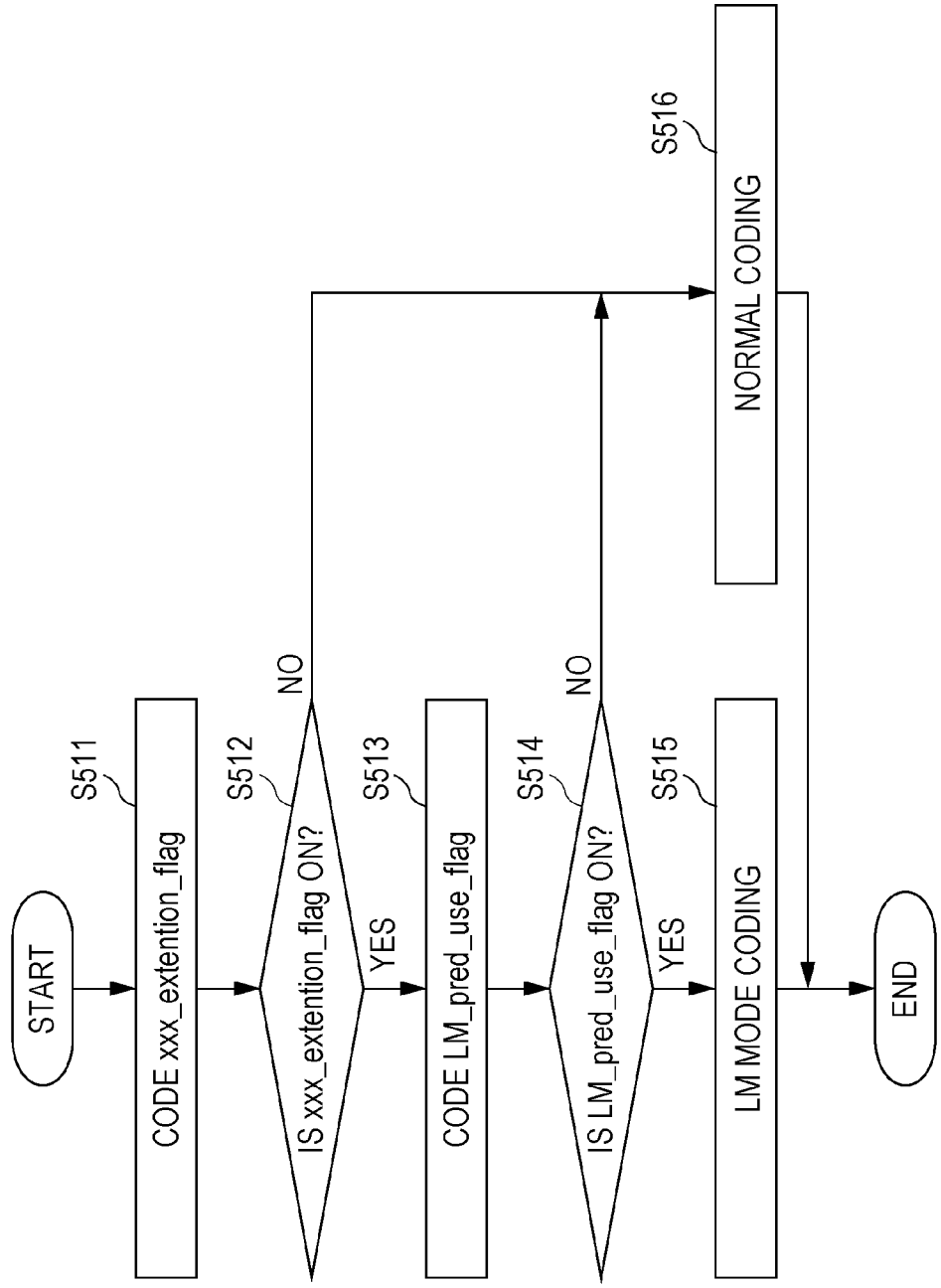
FIG. 10 is a flow chart of the image coding method according to a variation of the exemplary embodiments.

Also, the image coding apparatus according to the present exemplary embodiment may perform processing illustrated in FIG. 10.

First, the image coding apparatus codes the first flag (xxx_extention_flag) that indicates whether the predetermined extension standard of the predetermined image coding standard is used (S511). In other words, the first flag indicates the profile of the predetermined image coding standard. That is, the first flag indicates whether the predetermined processing scheme is used.

Next, when the first flag indicates that the extension standard is used (Yes in S512), the image coding apparatus codes a third flag (LM_pred_use_flag) that indicates whether a third scheme (LM mode) for predicting a color difference signal from a luminance signal is used (S513).

Note that the image coding apparatus writes the first flag and the third flag in either of a header of a sequence unit (unit including a plurality of pictures), a header of a picture unit, a header of a video unit, and a header of a slice unit. For example, the first flag and the third flag are written in an identical header.

When the third flag indicates that the third scheme (LM mode) is used (Yes in S514), the image coding apparatus codes the image by using the third scheme (LM mode) (S515).

On the other hand, when the third flag indicates that the third scheme (LM mode) is not used (No in S514), the image coding apparatus codes the image by using the second scheme (normal scheme) for coding the difference signal of the current block, the second scheme being a coding scheme included in the image coding standard (S516).

Also, when the first flag indicates that the extension standard is not used (No in S512), the image coding apparatus codes the image by using the second scheme (normal scheme) (S516).

Note that, while individual processing for the first scheme (DPCM) and the third scheme (LM mode) has been described here, both of processing for the first scheme and processing for the third scheme may be used. In this case, the second flag and the third flag may be included in an identical header, and may be included in headers of different layers. Also, when the second flag and the third flag are included in the headers of the different layers, the first flag corresponding to each of the second flag and the third flag may be included in the header identical to the header of each of the second flag and the third flag. For example, sps_extention_flag and Dpcm_use_flag may be included in a header of a sequence unit (for example, SPS), and pps_extention_flag and LM_pred_use_flag may be included in a header of a picture unit (for example, PPS).

Figure 11:
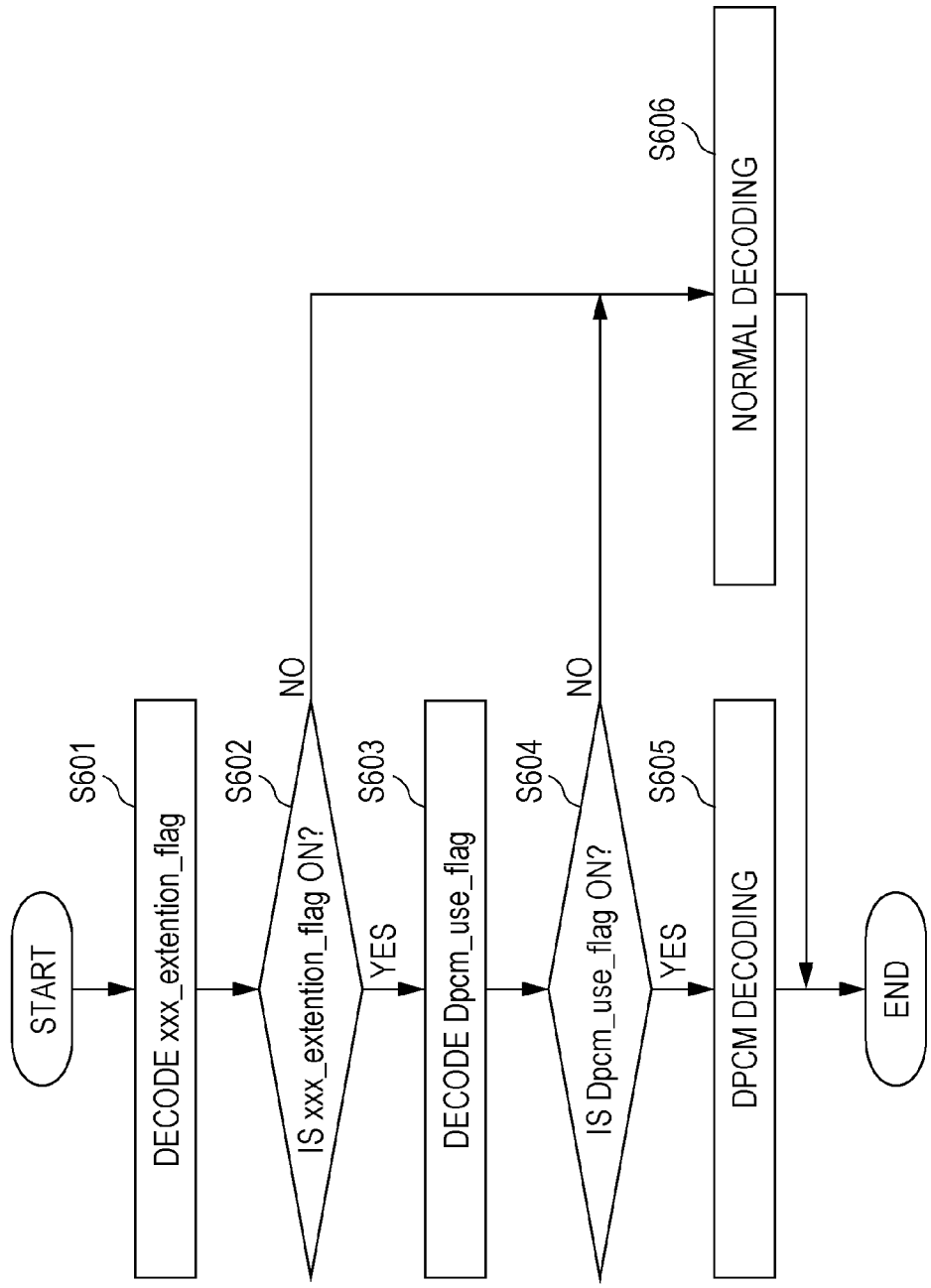
FIG. 11 is a flow chart of the image decoding method according to the exemplary embodiments.

Also, the image decoding apparatus according to the present exemplary embodiment performs processing illustrated in FIG. 11.

First, the image decoding apparatus decodes the first flag (xxx_extention_flag) that indicates whether a predetermined extension standard of a predetermined image decoding standard is used, from the bitstream (coded signal) (S601). In other words, the first flag indicates a profile of the predetermined image decoding standard. That is, the first flag indicates whether a predetermined processing scheme is used.

Next, when the first flag indicates that the extension standard is used (Yes in S602), the image decoding apparatus decodes, from the bitstream, the second flag (Dpcm_use_flag) that indicates whether the first scheme (DPCM) for decoding a difference between adjacent-to-each-other samples included in the difference signal of the current block is used, the first scheme being a decoding scheme included in the extension standard (S603).

Note that the image decoding apparatus decodes the first flag and the second flag from either of a header of a sequence unit (unit including a plurality of pictures), a header of a picture unit, a header of a video unit, and a header of a slice unit, which are included in the bitstream. For example, the first flag and the second flag are included in an identical header.

When the second flag indicates that the first scheme (DPCM) is used (Yes in S604), the image decoding apparatus decodes the image from the bitstream by using the decoding scheme for decoding the signal coded by the first scheme (DPCM) (S605).

On the other hand, when the second flag indicates that the first scheme (DPCM) is not used (No in S604), the image decoding apparatus decodes the image from the bitstream by the decoding scheme for decoding the signal coded by the second scheme (normal scheme) for coding the difference signal of the current block, the decoding scheme being a decoding scheme included in the image decoding standard (S606).

Also, when the first flag indicates that the extension standard is not used (No in S602), the image decoding apparatus decodes the image from the bitstream by the decoding scheme for decoding the signal coded by the second scheme (normal scheme) (S606).

Figure 12:
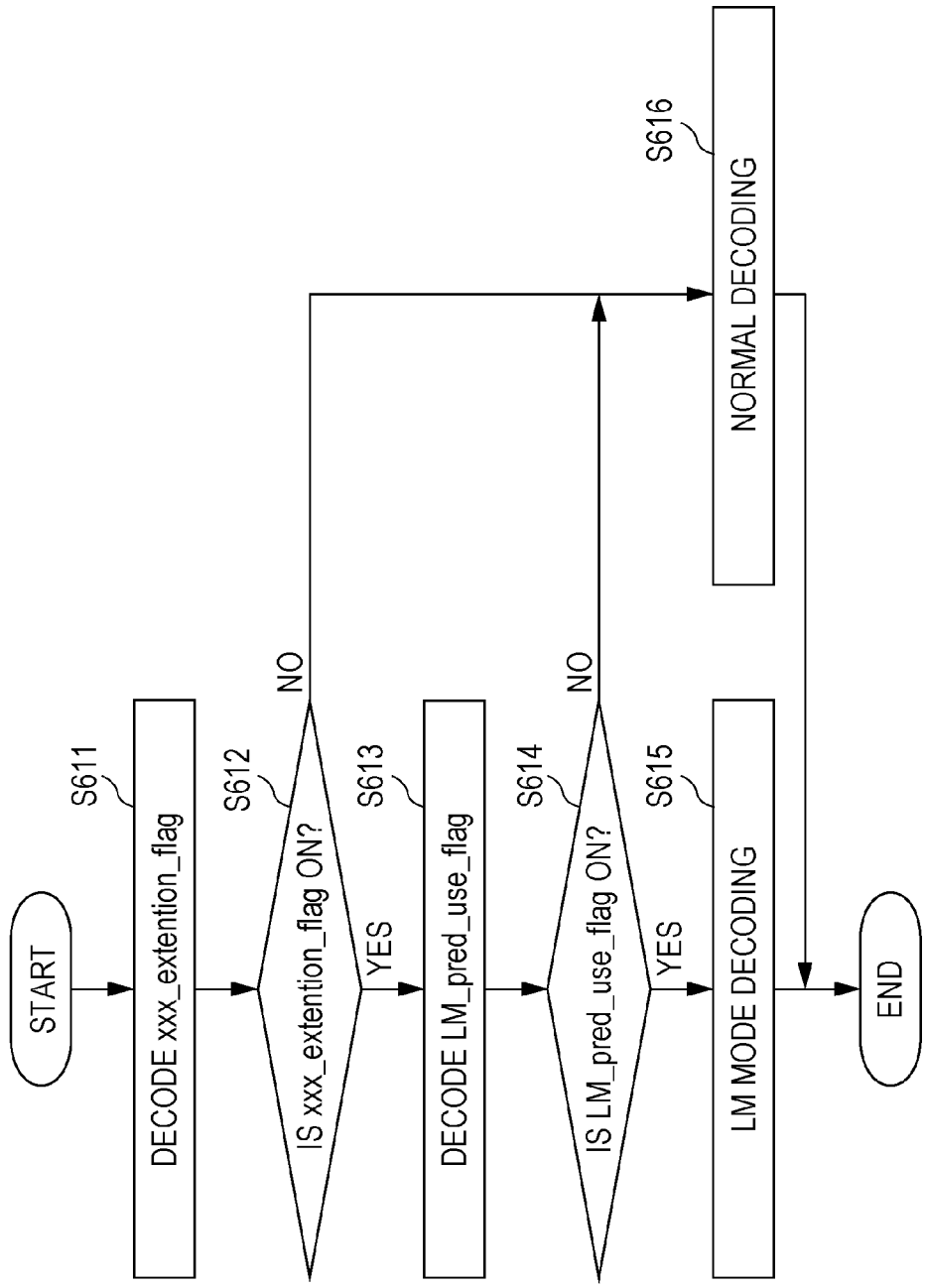
FIG. 12 is a flow chart of the image decoding method according to a variation of the exemplary embodiments.

Also, the image decoding apparatus according to the present exemplary embodiment may perform processing illustrated in FIG. 12.

First, the image decoding apparatus decodes, from the bitstream, the first flag (xxx_extention_flag) that indicates whether the predetermined extension standard of the predetermined image decoding standard is used (S611). In other words, the first flag indicates the profile of the predetermined image decoding standard. That is, the first flag indicates whether the predetermined processing scheme is used.

Next, when the first flag indicates that the extension standard is used (Yes in S612), the image decoding apparatus decodes, from the bitstream, the third flag (LM_pred_use_flag) that indicates whether the third scheme (LM mode) for predicting the color difference signal from the luminance signal is used (S613).

Note that the image decoding apparatus decodes the first flag and the third flag from either of a header of a sequence unit (unit including a plurality of pictures), a header of a picture unit, a header of a video unit, and a header of a slice unit. For example, the first flag and the third flag are included in an identical header.

When the third flag indicates that the first scheme (DPCM) is used (Yes in S614), the image decoding apparatus decodes the image from the bitstream by the decoding scheme for decoding the signal coded by the third scheme (LM mode) (S615).

On the other hand, when the third flag indicates that the third scheme (LM mode) is not used (No in S614), the image decoding apparatus decodes the image from the bitstream by the second scheme (normal scheme) for decoding the difference signal of the current block, the second scheme being a decoding scheme included in the image decoding standard (S616).

Also, when the first flag indicates that the extension standard is not used (No in S612), the image decoding apparatus decodes the image from the bitstream by the second scheme (normal scheme) (S616).

Note that, while individual processing for the first scheme (DPCM) and the third scheme (LM mode) has been described here, both of processing for the first scheme and processing for the third scheme may be used. In this case, the second flag and the third flag may be included in an identical header, and may be included in headers of different layers. Also, when the second flag and the third flag are included in the headers of the different layers, the first flag corresponding to each of the second flag and the third flag may be included in the header identical to the header of each of the second flag and the third flag. For example, sps_extention- _flag and Dpcm_use_flag may be included in a header of a sequence unit (for example, SPS), and pps_extention_flag and LM_pred_use_flag may be included in a header of a picture unit (for example, PPS).

While the image decoding apparatus and the image coding apparatus according to the exemplary embodiments have been described above, the present invention is not limited to these exemplary embodiments.

Also, individual processing units included in the above image decoding apparatus or the image coding apparatus according to the exemplary embodiments are typically implemented as an LSI, which is an integrated circuit. These processing units may be formed as separate chips, or some or all of the processing units may be included in one chip.

Also, the circuit integration is not limited to LSI, and may be implemented using a dedicated circuit or general-purpose processor. An FPGA (Field Programmable Gate Array) that is programmable after manufacturing of an LSI or a reconfigurable processor in which connections and settings of circuit cells within the LSI are reconfigurable may be used.

In the exemplary embodiment described above, individual components may be implemented with dedicated hardware or by executing a software program suitable for the components. The individual components may be implemented as a result of a program execution unit such as a CPU (Central Processing Unit) or processor loading and executing a software program recorded on a recording medium, such as a hard disk or a semiconductor memory.

In other words, the image decoding apparatus and the image coding apparatus include processing circuitry and storage electrically connected to the processing circuitry (accessible from the processing circuitry), The processing circuitry includes at least one of dedicated hardware and a program execution unit. Also, the storage stores a software program to be executed by the program execution unit in the case where the processing circuitry includes the program execution unit. The processing circuitry executes the above image decoding method or image coding method according to the exemplary embodiments by using the storage.

Further, the exemplary embodiment of the present invention may be implemented by a software program or a non-transitory computer-readable recording medium storing the program thereon. Obviously, the program can be distributed via a transmission medium such as the Internet.

Also, numerical values used above are merely illustrative ones used to describe the embodiments of the present invention specifically, and thus the present invention is not limited to the illustrative numerical values.

Also, how functional blocks are divided in block diagrams is merely an example, and thus a plurality of functional blocks may be implemented as one functional block, one functional block may be divided into a plurality of functional blocks, or part of the function may be transferred to another functional block. Also, functions of a plurality of functional blocks having similar functions may be processed in parallel or in a time-divided manner by using hardware or software.

Also, the order in which steps included in the above image decoding method or image coding method are executed is merely an illustrative one used to describe the exemplary embodiments of the present invention specifically, and thus the steps may be executed in an order other than the above order. Also, some of the above steps may be executed simultaneously (in parallel) with another step.

While the image decoding apparatus and the image coding apparatus according to one or a plurality of aspects of the present invention have been described above on the basis of the exemplary embodiments, the present invention is not limited to these exemplary embodiments. The present exemplary embodiment to which various modifications conceivable by a person skilled in the art are made and aspects that are made by combining elements of different exemplary embodiments may also be within the scope of the one or the plurality of aspects of the present invention as long as such aspects do not depart from the gist of the present invention.

Third Exemplary Embodiment

The processes described in each of the exemplary embodiments above can be implemented easily in a standalone computer system by recording a program for implementing the configuration of a video coding method (image coding method) or video decoding method (image decoding method) described in each exemplary embodiment on a storage medium. The storage medium may be any given type of medium capable of storing the program, such as a magnetic disk, an optical disc, a magneto-optical disk, an IC (Integrated Circuit) card; or a semiconductor memory.

Now, exemplary applications of the video coding method (image coding method) or the video decoding method (image decoding method) described in each of the exemplary embodiments and systems using them will be further described. The systems include an image coding/decoding apparatus which includes an image coding apparatus that employs the image coding method and an image decoding apparatus that employs the image decoding method. Other configurations of the systems can be changed as appropriate in accordance with the circumstances.

Figure 13:
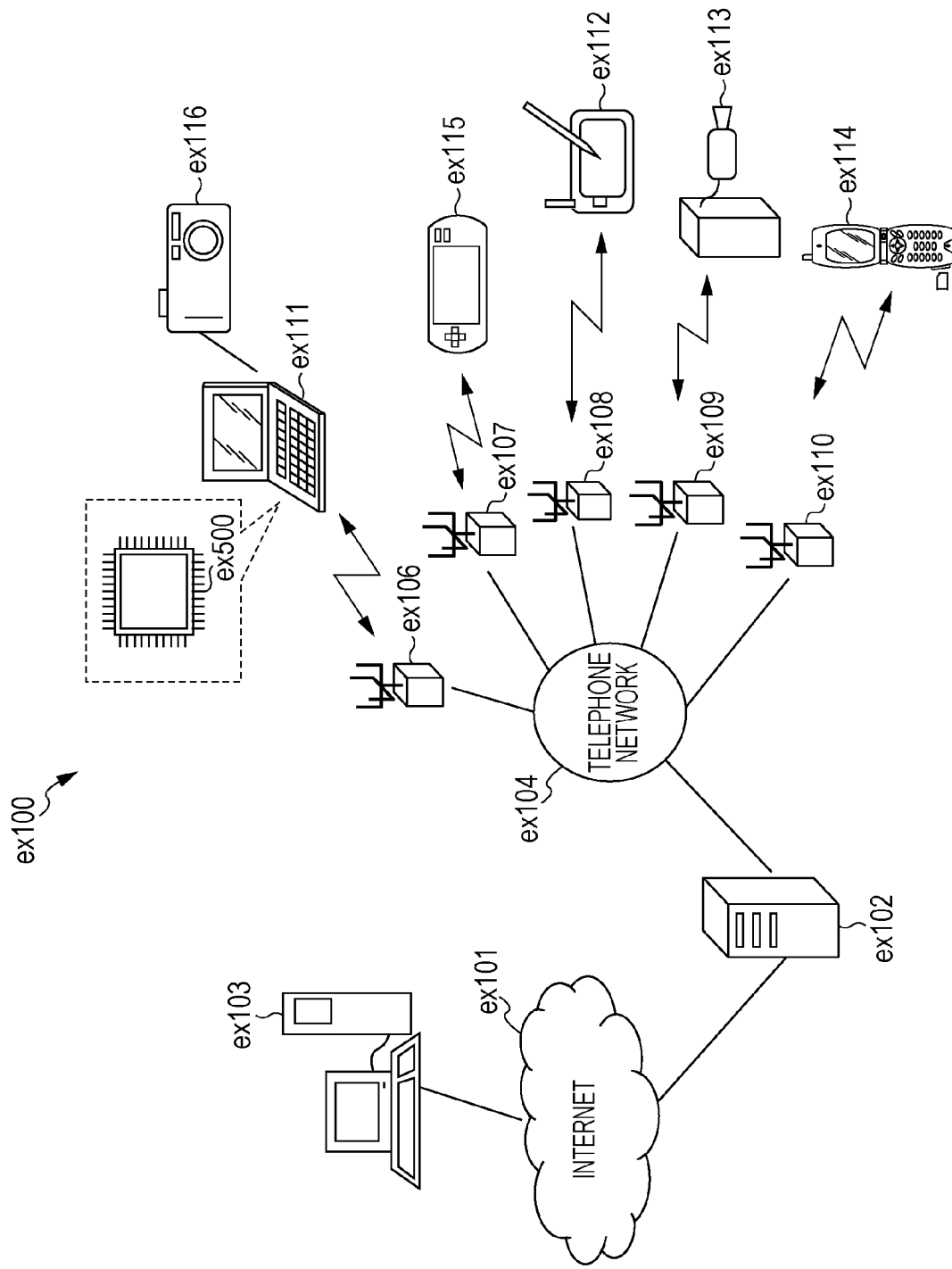
FIG. 13 is a diagram illustrating the overall configuration of a content providing system that implements content distribution services.

FIG. 13 is a diagram illustrating an overall configuration of content providing system ex100 that implements content distribution services. An area in which communication services are provided is divided into cells of a desired size. Base stations ex106, ex107, ex108, ex109, and ex110, which are fixed wireless stations, are installed in the respective cells.

In this content providing system ex100, various devices, such as computer ex111, PDA (Personal Digital Assistant) ex112, camera ex113, mobile phone ex114, game machine ex115 are connected to Internet ex101 via Internet service provider ex102, telephone network ex104, and base stations ex106 to ex110.

Note that the configuration of content providing system ex100 is not limited to the configuration illustrated in FIG. 13, and any given combination of the elements may be connected. Also, the individual devices may be directly connected to telephone network ex104 instead of via base stations ex106 to ex110 which are fixed wireless stations. Alternatively, the individual devices may be directly interconnected via near field communication or the like.

Camera ex113 is a device capable of capturing moving images, such as a digital camcorder. Camera ex116 is a device capable of capturing still images and moving images, such as a digital camera. Also, mobile phone ex114 may be any of a mobile phone based on the GSM (registered trademark) (Global System for Mobile Communications) scheme, CDMA (Code Division Multiple Access) scheme, W-CDMA (Wideband-Code Division Multiple Access) scheme, LTE (Long Term Evolution) scheme, or HSPA (High Speed Packet Access) scheme; a PHS (Personal Handyphone System); and so forth.

In content providing system ex100, camera ex113 or the like is connected to streaming server ex103 via base station ex109 and telephone network ex104. In this way, live streaming is implemented. During live streaming, the coding process is performed on content (for example, video of a music event) obtained by the user using camera ex113 in a manner as described in each of the above-described exemplary embodiments (that is, camera ex113 functions as an image coding apparatus according to one aspect of the present invention) and the resulting content is transmitted to streaming server ex103. Streaming server ex103 in turn distributes the received content as a stream to a client that has made a request. Examples of the client include computer ex111, PDA ex112, camera ex113, mobile phone ex114, and game machine ex115 capable of decoding the data that has undergone the coding process. Each device that has received the distributed data performs the decoding process on the received data to reproduce the data (that is, the device functions as an image decoding apparatus according to one aspect of the present invention).

Note that the coding process may be performed on the obtained data by camera ex113, by streaming server ex103 that performs a data transmission process, or by both of them on a processing-sharing basis. Similarly, the decoding process may be performed on the distributed data by the client, by streaming server ex103, or by both of them on a processing-sharing basis. Also, in addition to still and/or moving image data obtained by camera ex113, still and/or moving image data obtained by camera ex116 may be transmitted to streaming server ex103 via computer ex111. In this case, the coding process may be performed by any of camera ex116, computer ex111, and streaming server ex103, or by all of them on a processing-sharing basis.

These coding and decoding processes are performed in general by LSI ex500 included in computer ex111 or each device. LSI ex500 may be formed as a single chip or a plurality of chips. Alternatively, software for video coding/decoding may be recorded on a recording medium (such as a CD-ROM, a flexible disk, or a hard disk) that is readable by computer ex111 or the like, and the coding and decoding processes may be performed using the software. Further, in the case where mobile phone ex114 is equipped with a camera, moving image data obtained with the camera may be transmitted. This moving image data is data that has been coded by LSI ex500 included in mobile phone ex114.

Also, streaming server ex103 may be constituted by a plurality of servers or a plurality of computers that process, record, and distribute data in a distributed manner.

In the above-described manner, content providing system ex100 allows the client to receive and reproduce coded data. Accordingly, content providing system ex100 allows the client to receive, decode, and reproduce information transmitted by a user in real time, and thus allows a user not having a special right or equipment to implement personal broadcasting.

Figure 14:
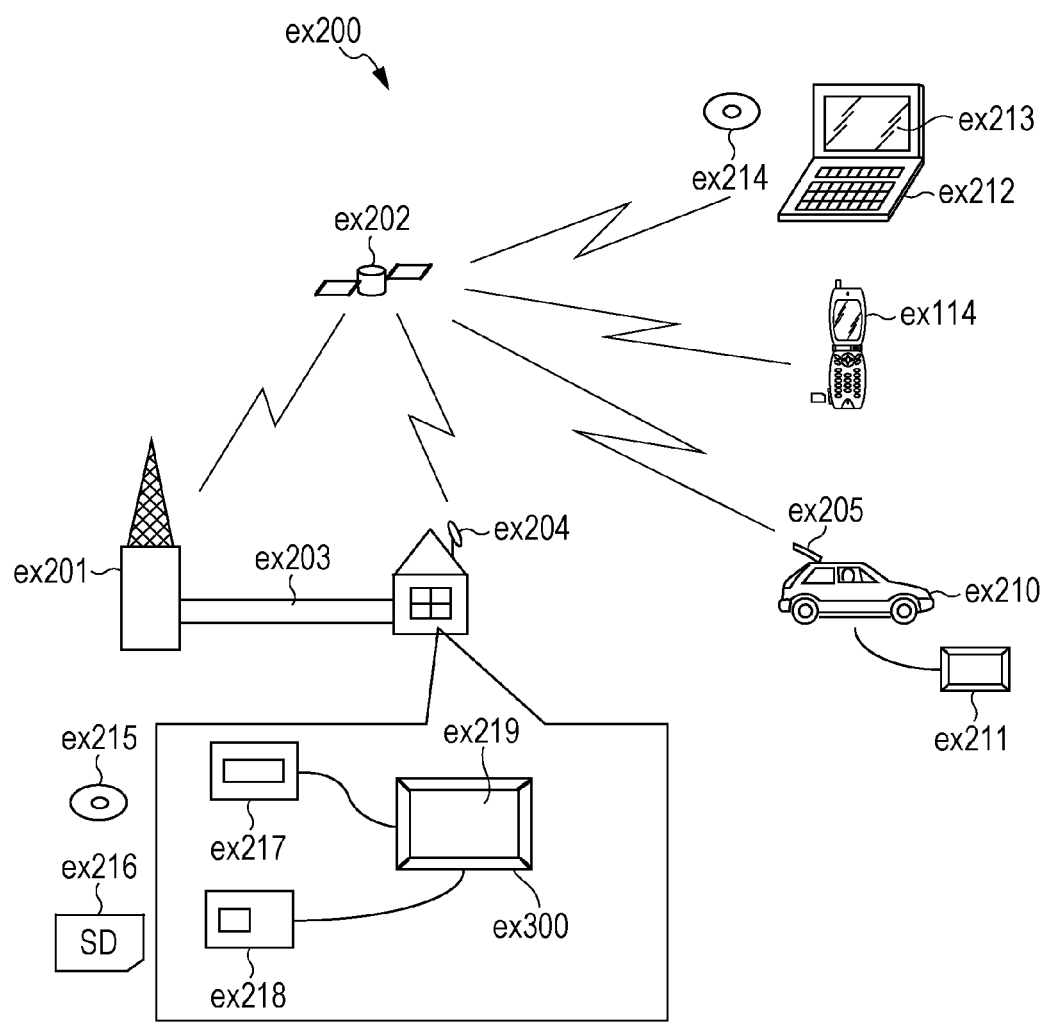
FIG. 14 is a diagram illustrating the overall configuration of a digital broadcasting system.

In addition to the example of content providing system ex100, at least one of the video coding apparatus (image coding apparatus) and the video decoding apparatus (image decoding apparatus) according to each of the above-described exemplary embodiments can be incorporated in digital broadcasting system ex200 as illustrated in FIG. 14. Specifically, broadcasting station ex201 transmits a radio wave of multiplexed data obtained by multiplexing video data, music data, and the like, via communication to broadcasting satellite ex202. This video data is data coded using the video coding method described in each of the above-described exemplary embodiments (that is, data coded by the image coding apparatus according to one aspect of the present invention). Upon receipt of this data, broadcasting satellite ex202 transmits a broadcasting radio wave, and home antenna ex204 capable of receiving satellite broadcasting receives this radio wave. An apparatus such as television (receiver) ex300 or set top box (STB) ex217 decodes and reproduces the received multiplexed data (that is, the apparatus functions as the image decoding apparatus according to one aspect of the present invention).

Also, the video decoding apparatus or the video coding apparatus described in each of the above-described exemplary embodiments can be implemented in reader/recorder ex218 that reads and decodes the multiplexed data recorded on recording medium ex215 such as a DVD (Digital Versatile Disc) or a BD (Blu-ray Disc); or that codes a video signal and further multiplexes a music signal with the video signal depending on circumstances, and writes the resulting signal on recording medium ex215. In this case, the reproduced video signal is displayed on monitor ex219, and the video signal can be reproduced by another apparatus or system using recording medium ex215 having the multiplexed data recorded thereon. Alternatively, the video decoding apparatus may be implemented in set top box ex217 connected to cable ex203 for cable television or home antenna ex204 for satellite/terrestrial broadcasting, and the video signal may be displayed on monitor ex219 of television ex300. At this time, the video decoding apparatus may be incorporated into television ex300 instead of set top box ex217.

Figure 15:
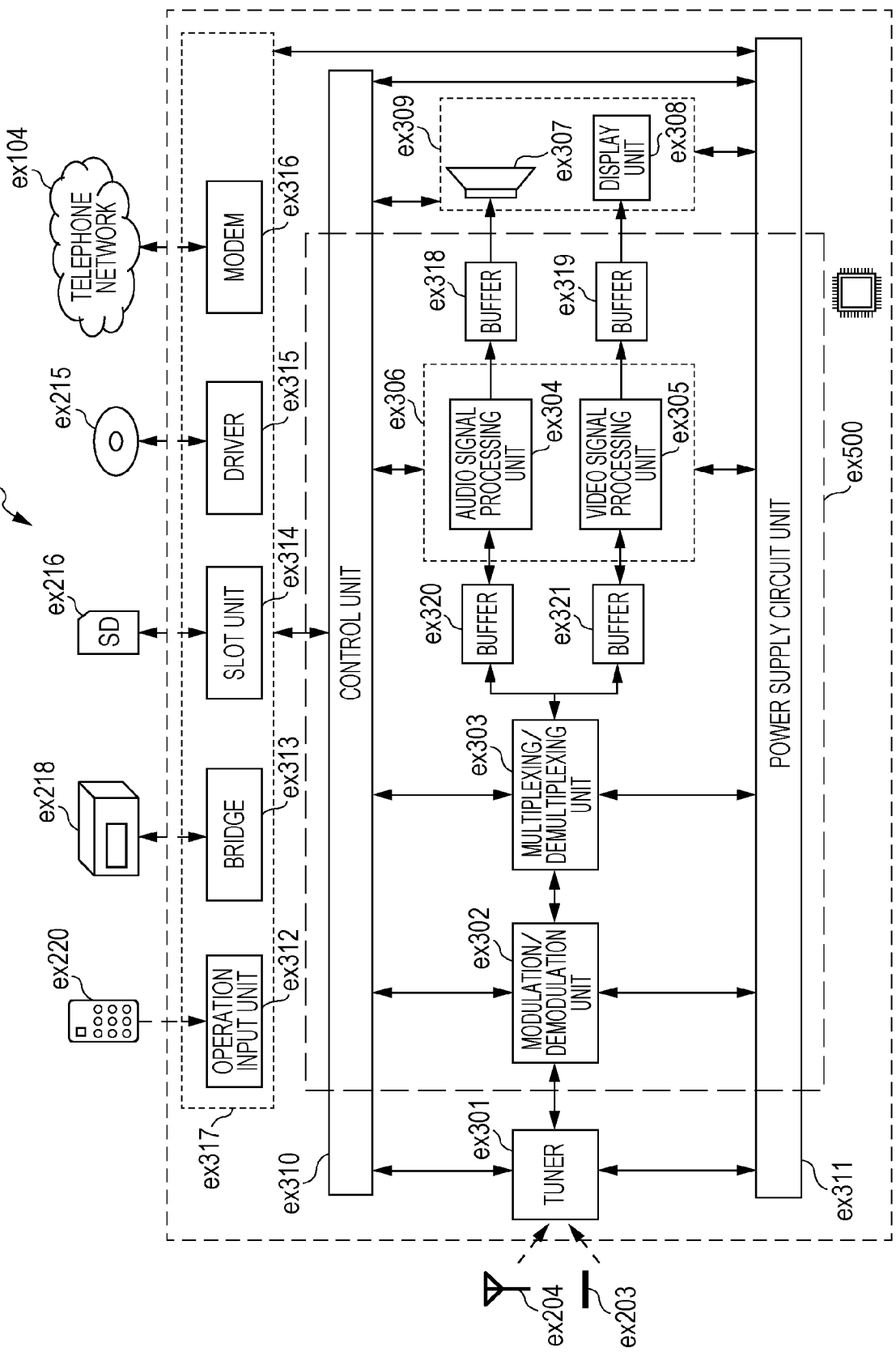
FIG. 15 is a block diagram illustrating an example of a configuration of a television.

FIG. 15 is a diagram illustrating television (receiver) ex300 that employs the video decoding method and the video coding method described in each of the exemplary embodiments above. Television ex300 includes tuner ex301 that obtains or outputs, via antenna ex204 or cable ex203 that receives broadcasting, multiplexed data in which video data and audio data are multiplexed together; modulation/demodulation unit ex302 that performs demodulation on the received multiplexed data or modulation on multiplexed data to be transmitted to outside; and multiplexing/demultiplexing unit ex303 that demultiplexes the demodulated multiplexed data into video data and audio data, or multiplexes video data and audio data that have been coded by signal processing unit ex306.

Television ex300 also includes signal processing unit ex306 and output unit ex309. Signal processing unit ex306 includes audio signal processing unit ex304 that decodes or codes audio data, and video signal processing unit ex305 that decodes or codes video data (video signal processing unit ex305 functions as the image coding apparatus or the image decoding apparatus according to one aspect of the present invention). Output unit ex309 includes speaker ex307 that outputs the decoded audio signal, and display unit ex308, such as a display, that displays the decoded video signal. Television ex300 further includes interface unit ex317 which includes operation input unit ex312 that accepts input of a user operation. Television ex300 further includes control unit ex310 that controls the individual units in an integrated manner, and power supply circuit unit ex311 that supplies electric power to the individual units. Interface unit ex317 may include bridge ex313 to be connected to an external device, such as reader/recorder ex218; slot unit ex314 that enables connection of recording medium ex216 such as an SD card; driver ex315 for connection to external recording medium ex215, such as a hard disk; and modem ex316 for connection to telephone network ex104 as well as operation input unit ex312. Note that recording medium ex216 is capable of electrically storing information by using a nonvolatile/volatile semiconductor memory included therein. The individual units of television ex300 are connected to one another via a synchronization bus.

First, a configuration that allows television ex300 to decode and reproduce multiplexed data obtained from outside with antenna ex204 or the like will be described. Television ex300 receives a user operation from remote control ex220 or the like. Based on control performed by control unit ex310 including a CPU or the like, multiplexing/demultiplexing unit ex303 demultiplexes multiplexed data that has been demodulated by modulation/demodulation unit ex302. Further, in television ex300, audio signal processing unit ex304 decodes the separated audio data and video signal processing unit ex305 decodes the separated video data by using the image decoding method described in each of the above exemplary embodiments. Further, the decoded audio signal and video signal are output to outside from output unit ex309. When the audio signal and the video signal are output, these signals may be temporarily stored in buffers ex318 and ex319 or the like so that they are reproduced in synchronization with each other. Also, television ex300 may read multiplexed data from recording media ex215 and ex216 such as a magnetic/optical disc and an SD card as well as from broadcasting, Next, a configuration that allows television ex300 to code an audio signal and a video signal and to transmit the resulting signals to outside or write the resulting signals on a recording medium or the like will be described. Television ex300 receives a user operation from remote control ex220 or the like. Based on control performed by control unit ex310, audio signal processing unit ex304 codes the audio signal, and video signal processing unit ex305 codes the video signal by using the image coding method described in each of the above exemplary embodiments. The coded audio signal and video signal are multiplexed by multiplexing/demultiplexing unit ex303 and the resulting multiplexed signal is output to outside. When the audio signal and the video signal are multiplexed, these signals may be temporarily stored in buffers ex320 and ex321 or the like so that they are synchronized with each other. Note that a plurality of buffers may be provided as illustrated as buffers ex318, ex319, ex320, and ex321; or one or more buffers may be shared. Further, in addition to the illustrated buffers, for example, data may be stored in a buffer that serves as a buffering member for avoiding an overflow or underflow in the system between modulation/demodulation unit ex302 and multiplexing/demultiplexing unit ex303 or the like.

Television ex300 may also include a configuration for receiving audio/video input of a microphone or a camera in addition to the configuration for obtaining audio data and video data from broadcasting, a recording medium, or the like; and may perform the coding process on the data obtained therefrom. Although television ex300 has been described as the configuration capable of performing the above-described coding process, multiplexing, and outputting to outside, television ex300 may be a configuration incapable of performing these processes and only capable of the reception, decoding process, and outputting to outside.

In the case where multiplexed data is read from and written to a recording medium by reader/recorder ex218, the decoding process or the coding process may be performed by television ex300, by reader/recorder ex218, or by both television ex300 and reader/recorder ex218 on a processing-sharing basis.

Figure 16:
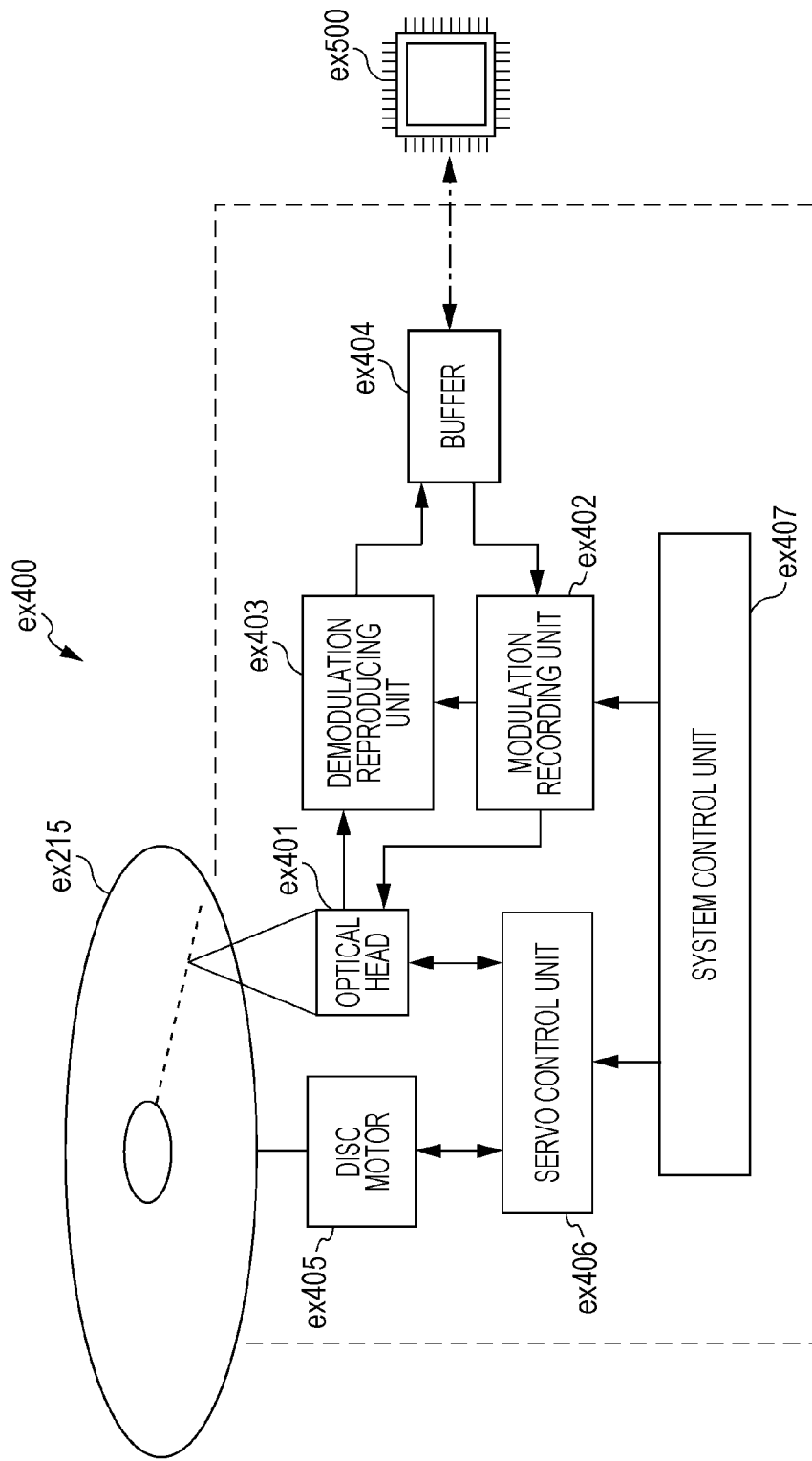
FIG. 16 is a block diagram illustrating an example of a configuration of an information reproducing/recording unit that reads information from and writes information to a recording medium which is an optical disc.

FIG. 16 illustrates an example of a configuration of information reproducing/recording unit ex400 in the case of reading data from and writing data to an optical disc. Information reproducing/recording unit ex400 includes optical head ex401, modulation recording unit ex402, demodulation reproducing unit ex403, buffer ex404, disc motor ex405, survo control unit ex406, and system control unit ex407. Optical head ex401 irradiates a recording surface of recording medium ex215, which is an optical disc; with a laser spot to write information thereon; and detects reflected light from the recording surface of recording medium ex215 to read information. Modulation recording unit ex402 electrically drives a semiconductor laser included in optical head ex401 to modulate a laser beam in accordance with to-be-recorded data. Demodulation reproducing unit ex403 amplifies a reproduced signal which is obtained by electrically detecting reflected light from the recording surface by a photodetector included in optical head ex401, separates and demodulates signal components recorded on recording medium ex215, and reproduces necessary information. Buffer ex404 temporarily stores information to be recorded on recording medium ex215 and information reproduced from recording medium ex215. Disc motor ex405 rotates recording medium ex215. Survo control unit ex406 moves optical head ex401 to a certain information track while controlling rotational driving of disc motor ex405 to perform a laser spot tracking process. System control unit ex407 controls information reproducing/recording unit ex400. The above-described reading and writing processes are implemented as a result of system control unit ex407 performing recording/reproduction of information via optical head ex401 while causing modulation recording unit ex402, demodulation reproducing unit ex403, and survo control unit ex406 to operate in cooperation with one another and using various pieces of information held in buffer ex404 and generating/adding new information as needed, System control unit ex407 includes, for example, a microprocessor and performs these processes by executing a read/write program.

Although optical head ex401 that irradiates the recording surface with a laser spot has been described above, optical head ex401 may include a configuration for performing high-density recording using near field light.

Figure 17:
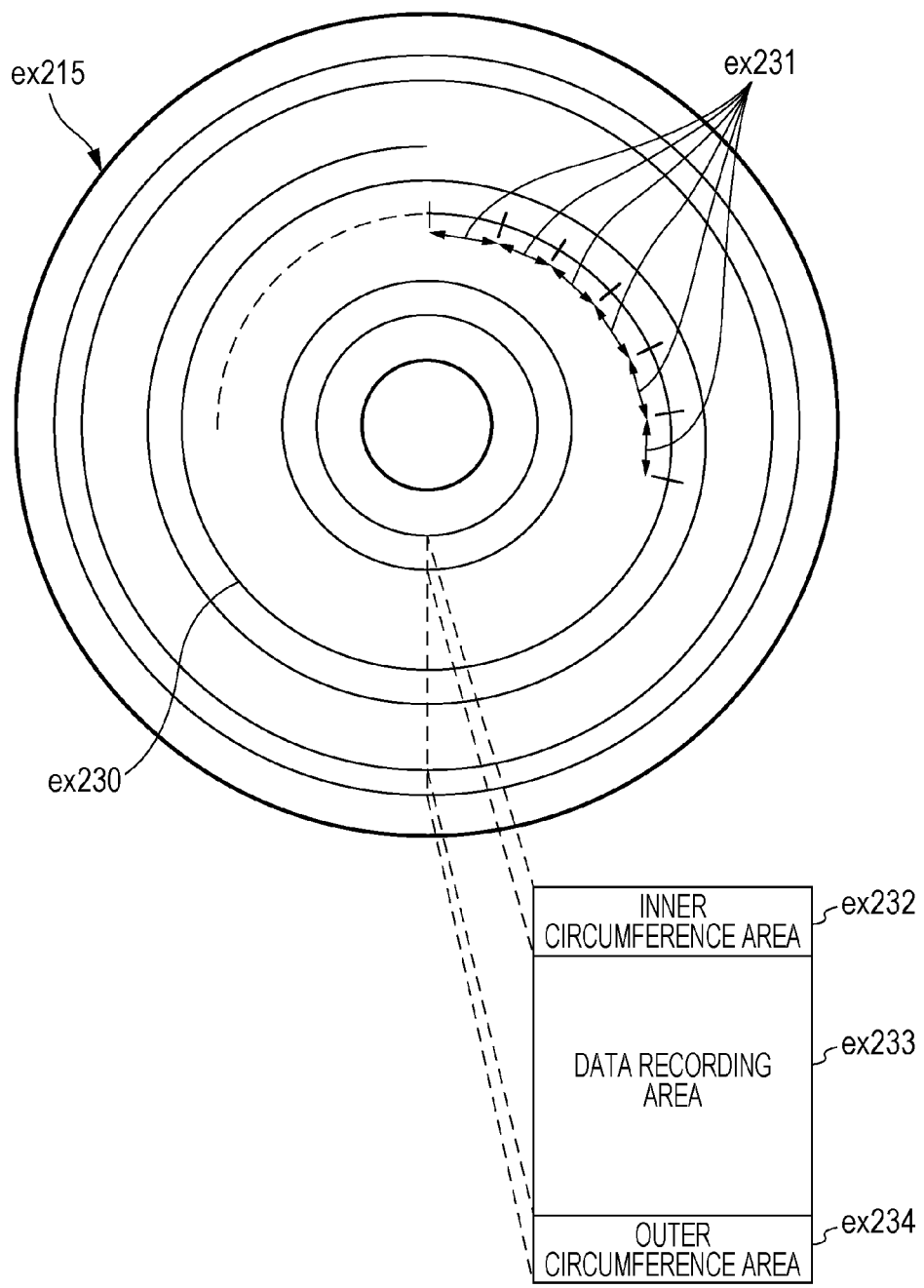
FIG. 17 is a diagram illustrating an example of a structure of an optical disc recording medium.

FIG. 17 is a schematic diagram of recording medium ex215 which is an optical disc. On the recording surface of recording medium ex215, a guide groove (groove) is spirally formed. In information track ex230, address information that represents an absolute position on the disc is pre-recorded by a change in the shape of the groove. This address information includes information identifying positions of recording blocks ex231 which are units in which data is recorded. A recording/reproducing apparatus can identify a recording block by reproducing information track ex230 and reading the address information. Also, recording medium ex215 includes data recording area ex233, inner circumference area ex232, and outer circumference area ex234. Data recording area ex233 is an area used for recording user data. Inner circumference area ex232 and outer circumference area ex234 that are located on the inner side and the outer side of data recording area ex233, respectively, are used for purposes other than recording of user data. Information reproducing/recording unit ex400 performs reading/writing of coded audio data, coded video data, or multiplexed data of these pieces of data on data recording area ex233 of recording medium ex215 thus configured.

The description has been given using a single-layer optical disc such as a DVD or BD by way of example above, the optical disc used is not limited to such a disc and may be a multi-layered optical disc for which recording can be performed on part other than the surface. Alternatively, the optical disc used may be an optical disc on which multi-dimensional recording/reproduction can be performed by recording information at the same position of the disc using light of various waveforms different from one another, by recording information on different layers at various angles, or the like.

In addition, in digital broadcasting system ex200, data may be received by vehicle ex210 equipped with antenna ex205 from broadcasting satellite ex202 or the like and a moving image may be reproduced on a display device of car navigation system ex211 mounted on vehicle ex210. Note that the configuration illustrated in FIG. 15 additionally including a GPS reception unit is conceivable as the configuration of car navigation system ex211, and the same applies to computer ex111, mobile phone ex114, or the like.

Figure 18A:
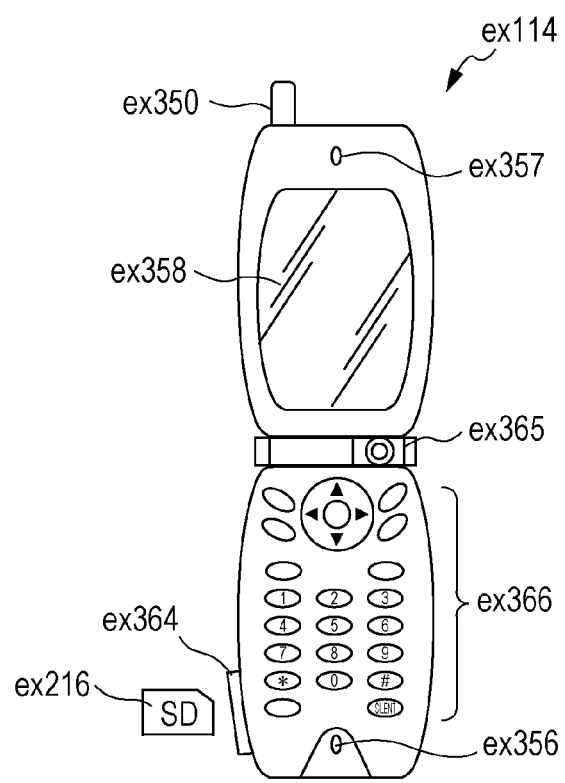
FIG. 18A is a diagram illustrating an example of a mobile phone.

FIG. 18A is a diagram illustrating mobile phone ex114 that employs the video decoding method and the video coding method described in the above exemplary embodiments. Mobile phone ex114 includes antenna ex350 that transmits and receives a radio wave to and from base station ex110; camera unit ex365 capable of capturing video and still images: and display unit ex358, such as a liquid crystal display, that displays the video captured by camera unit ex365 and data obtained by decoding video or the like received with antenna ex350. Mobile phone ex114 further includes a body including operation key unit ex366; audio output unit ex357 such as a speaker for outputting audio; audio input unit ex356 such as a microphone for inputting audio; memory unit ex367 that stores coded data or decoded data of captured video, captured still images, recorded audio, received video, received still images, or received emails; and slot unit ex364 which is an interface to a recording medium which similarly stores data thereon.

Figure 18B:
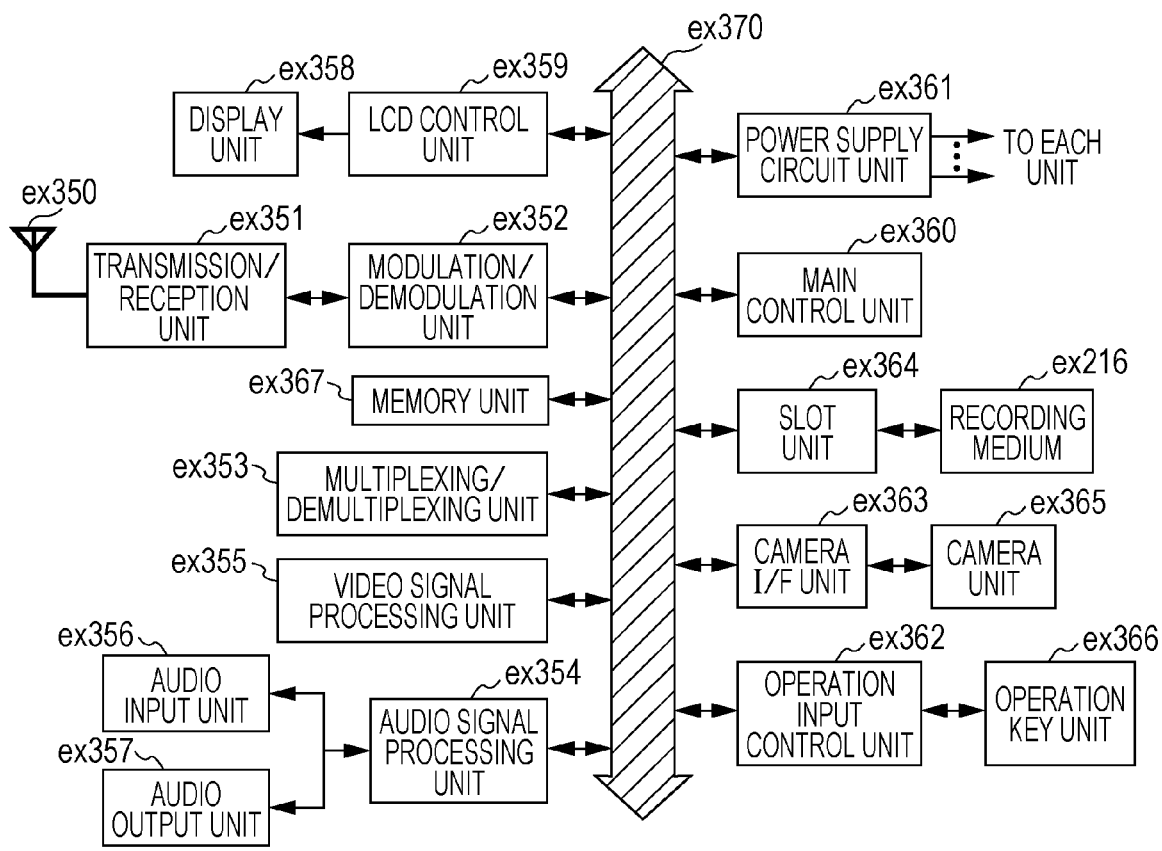
FIG. 18B is a block diagram illustrating an example of a configuration of the mobile phone.

Further, an example of a configuration of mobile phone ex114 will be described with reference to FIG. 18B. Mobile phone ex114 includes main control unit ex360 that controls individual units of the body which includes display unit ex358 and operation key unit ex366 in an integrated manner. Mobile phone ex114 also includes power supply circuit unit ex361, operation input control unit ex362, video signal processing unit ex355, camera interface unit ex363, LCD (Liquid Crystal Display) control unit ex359, modulation/demodulation unit ex352, multiplexing/demultiplexing unit ex353, audio signal processing unit ex354, slot unit ex364, and memory unit ex367 which are connected to main control unit ex360 via bus ex370.

When an on-hook/power key is turned on through a user operation, power supply circuit unit ex361 supplies electric power to individual units from a battery pack to activate mobile phone ex114 into an operable state.

In mobile phone ex114, in a voice call mode, audio signal processing unit ex354 converts an audio signal obtained by audio input unit ex356 into a digital audio signal, modulation/demodulation unit ex352 performs spread spectrum processing on this digital audio signal, and transmission/reception unit ex351 performs digital-to-analog conversion processing and frequency conversion processing on this signal and then transmits the resulting signal via antenna ex350 in accordance with control performed by main control unit ex360 which includes a CPU, a ROM, and a RAM. Also, in mobile phone ex114, in the voice call mode, transmission/reception unit ex351 amplifies reception data received via antenna ex350 and performs frequency conversion processing and analog-to-digital conversion processing, modulation/demodulation unit ex352 performs spread spectrum processing on the resulting signal, audio signal processing unit ex354 converts the resulting signal into an analog audio signal. The analog audio signal is then output from audio output unit ex357.

In the case where an email is transmitted in a data communication mode, text data of the email input through operation of operation key unit ex366 of the body or the like is sent to main control unit ex360 via operation input control unit ex362. Main control unit ex360 performs control such that modulation/demodulation unit ex352 performs spread spectrum processing on the text data and transmission/reception unit ex351 performs digital-to-analog conversion processing and frequency conversion processing on the text data and then transmits the resulting text data to base station ex110 via antenna ex350. In the case of receiving an email, substantially the opposite processing is performed on the received data, and the resulting text data is output to display unit ex358.

In the case where video, a still image, or a combination of video and audio are transmitted in the data communication mode, video signal processing unit ex355 compresses and codes a video signal supplied from camera unit ex365 by using the video coding method described in each of the above exemplary embodiments (that is, video signal processing unit ex355 functions as the image coding apparatus according to one aspect of the present invention), and sends the coded video data to multiplexing/demultiplexing unit ex353. Also, audio signal processing unit ex354 codes an audio signal obtained by audio input unit ex356 while the video, still image, or the like is being captured by camera unit ex365, and sends the coded audio data to multiplexing/demultiplexing unit ex353.

Multiplexing/demultiplexing unit ex353 multiplexes the coded video data supplied from video signal processing unit ex355 and the coded audio data supplied from audio signal processing unit ex354 in accordance with a certain scheme. Modulation/demodulation unit (modulation/demodulation circuit unit) ex352 performs spread spectrum processing on the resulting multiplexed data. Transmission/reception unit ex351 performs digital-to-analog conversion processing and frequency conversion processing on the multiplexed data, and then transmits the resulting data via antenna ex350.

In the case of receiving data of a moving image file linked to a website or the like or an email attached with video or audio in the data communication mode, multiplexing/demultiplexing unit ex353 demultiplexes multiplexed data into a bitstream of video data and a bitstream of audio data in order to decode the multiplexed data received via antenna ex350. Multiplexing/demultiplexing unit ex353 supplies the coded video data to video signal processing unit ex355 and the coded audio data to audio signal processing unit ex354 via synchronization bus ex370. Video signal processing unit ex355 performs decoding using a video decoding method corresponding to the video coding method described in each of the above exemplary embodiments to decode the video signal (that is, video signal processing unit ex355 functions as the image decoding apparatus according to one aspect of the present invention). Then, for example, video or still image included in the moving image file linked to the website is displayed on display unit ex358 via LCD control unit ex359. Also, audio signal processing unit ex354 decodes the audio signal, and the resulting audio is output by audio output unit ex357.

Like television ex300, three implementation forms, that is, a transmission/reception terminal including both an encoder and a decoder, a transmission terminal only including an encoder, and a reception terminal only including a decoder, are conceivable for a terminal such as mobile phone ex114. Further, the case has been described in which multiplexed data in which video data, audio data, and so forth are multiplexed is received and transmitted in digital broadcasting system ex200; however, the multiplexed data may be data in which text data related to the video is multiplexed other than audio data or video data alone may be used instead of the multiplexed data.

As described above, the video coding method or the video decoding method described in each of the above exemplary embodiments is applicable to any of the aforementioned devices and systems. In such a way, advantages described in each of the above exemplary embodiments can be obtained.

Also, the present invention is not limited to the exemplary embodiments above, and various modifications and corrections can be made without departing from the scope of the present invention.

Fourth Exemplary Embodiment

Video data can also be generated by switching between the video coding method or apparatus described in each of the above exemplary embodiments and a video coding method or apparatus based on a different standard, such as MPEG-2, MPEG-4 AVC, or VC-1 as appropriate.

In the case where a plurality of pieces of video data based on different standards are generated, a decoding method corresponding to each of the standards needs to be selected at the time of decoding. However, because which standard the to-be-decoded video data is based on is not identifiable, it is challenging to select an appropriate decoding method.

To deal with such a challenge, multiplexed data in which audio data or the like is multiplexed with video data is configured to include identification information that indicates which standard the video data is based on. A specific structure of multiplexed data including video data that is generated using the video coding method or apparatus described in each of the above exemplary embodiments will be described below. Multiplexed data is a digital stream in the MPEG-2 transport stream formant.

FIG. 19 is a diagram illustrating a structure of multiplexed data. As illustrated in FIG. 19, multiplexed data is obtained by multiplexing one or more of a video stream, an audio stream, a presentation graphics stream (PG), and an interactive graphics stream. The video stream represents a main video and a sub video of a movie. The audio stream (IG) represents a main audio part of the movie and sub audio to be mixed with the main audio. The presentation graphics stream represents the subtitle of the movie. Here, the main video refers to a video usually displayed on a window, whereas the sub video refers to a video displayed within the main video as a small window. The interactive graphics stream represents a dialog window created by placing GUI components on the window. The video stream is coded using the video coding method or apparatus described in each of the above exemplary embodiments and using the video coding method or apparatus compliant with an existing standard, such as MPEG-2, MPEG-4 AVC, or VC-1. The audio stream is coded using a standard, such as Dolby AC-3 (Audio Code number 3), Dolby Digital Plus, MLP (Meridian Lossless Packing), DTS (Digital Theater Systems), DTS-HD, or linear PCM (Pulse Code Modulation).

Each stream included in multiplexed data is identified by a PID (Packet Identifier), For example, a video stream to be used as video of a movie is assigned 0x1011. An audio stream is assigned any one of 0x1100 to 0x111F. A presentation graphics stream is assigned any one of 0x1200 to 0x121F, An interactive graphics stream is assigned any one of 0x1B00 to 0x141F. A video stream to be used as sub video of the movie is assigned any one of 0x1B00 to 0x1B1F. An audio stream to be used as sub audio to be mixed with main audio is assigned any one of 0x1A00 to 0x1A1F.

Figure 20:
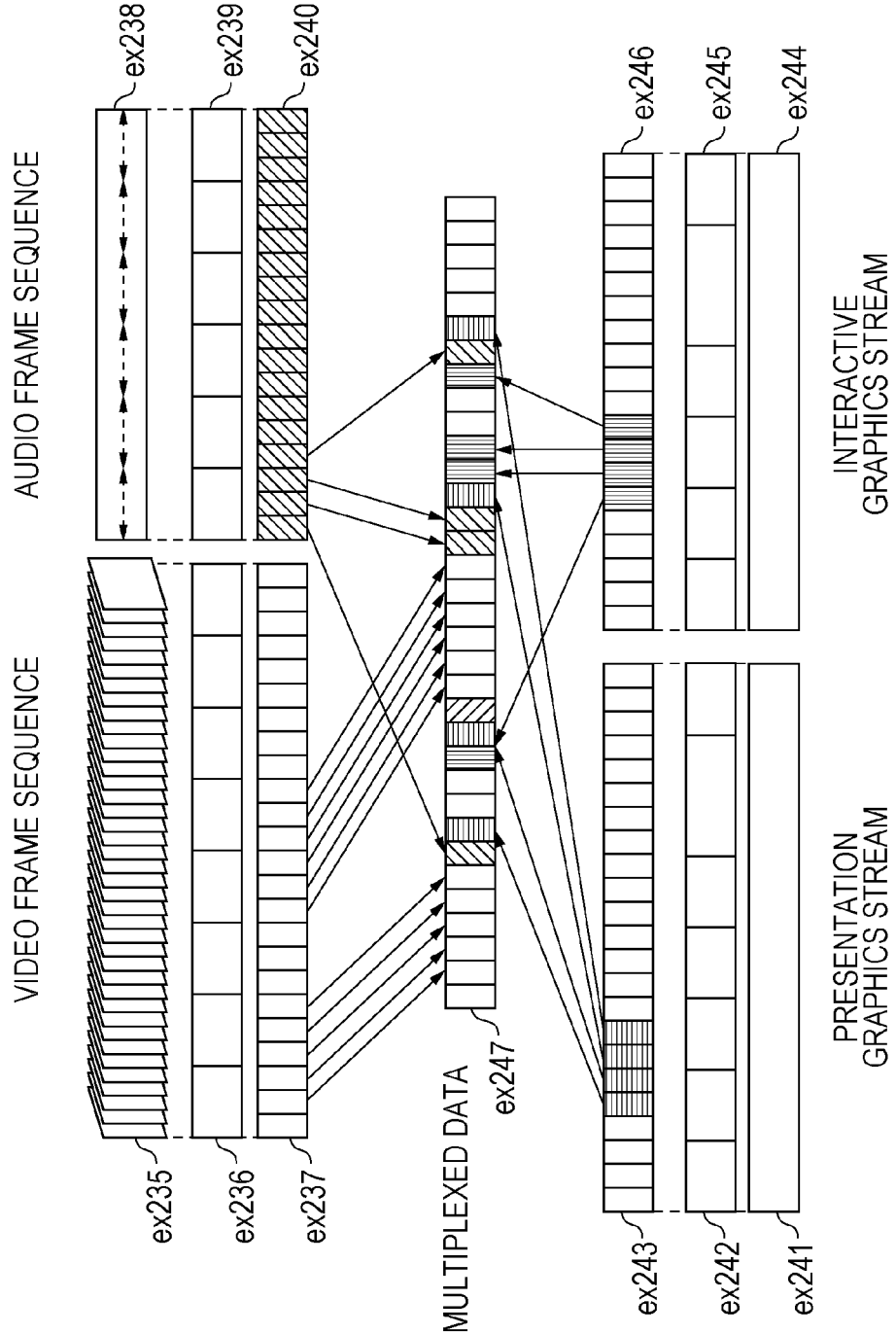
FIG. 20 is a diagram schematically illustrating how individual streams are multiplexed into multiplexed data.

FIG. 20 is a diagram schematically illustrating how individual streams are multiplexed into multiplexed data. Video stream ex235 made up of a plurality of video frames and audio stream ex238 made up of a plurality of audio frames are converted into PES (Packetized Elementary Stream) packet sequences ex236 and ex239, and then into TS (Transport Stream) packets ex237 and ex240, respectively. Likewise, data of presentation graphics stream ex241 and data of interactive graphics stream ex244 are converted into PES packet sequences ex242 and ex245, and further into TS packets ex243 and ex246, respectively. Multiplexed data ex247 is formed by multiplexing these TS packets into one stream.

Figure 21:
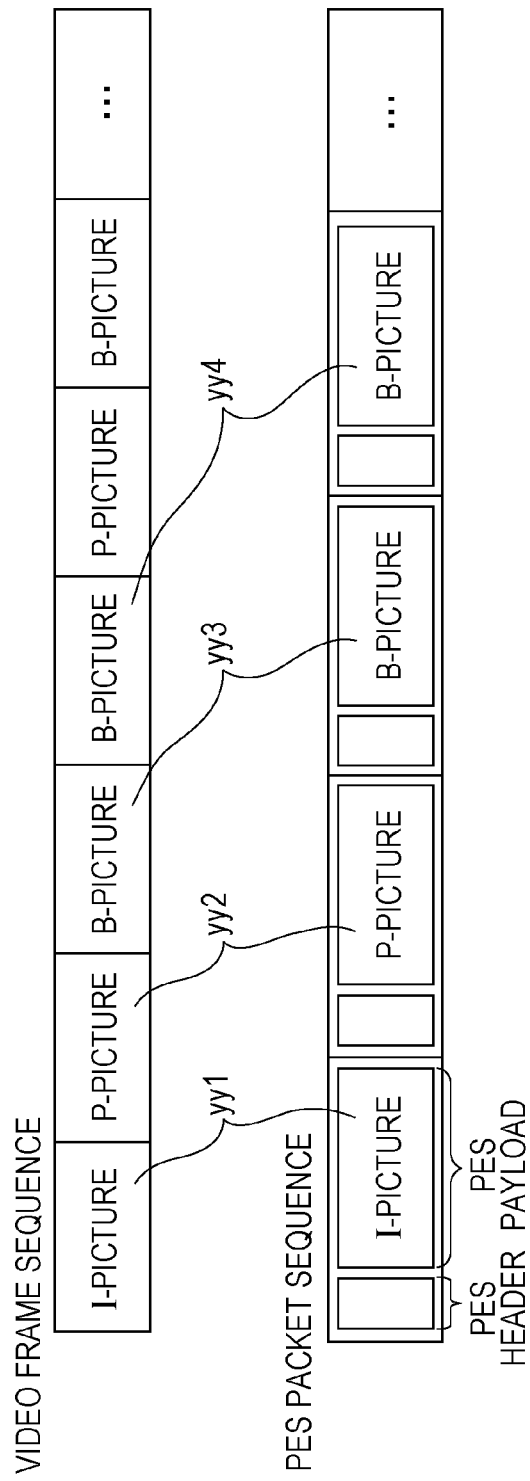
FIG. 21 is a diagram illustrating how a video stream is stored in a PES (Packetized Elementary Stream) packet sequence in a more detailed manner.

FIG. 21 illustrates how a video stream is stored in a PES packet sequence in detail. The upper row in FIG. 21 illustrates a video frame sequence of the video stream. The lower row illustrates a PES packet sequence. As denoted by arrows yy1, yy2, yy3, and yy4 in FIG. 21, I (intra)-pictures, B (bidirectional)-pictures, and P (predicted)-pictures which are a plurality of video presentation units in a video stream are separated on a picture-by-picture basis, and are stored in the payload of respective PES packets. Each PES packet includes a PES header in which PTS (Presentation Time-Stamp) that represents display time of the picture and DTS (Decoding Time-Stamp) that represents decoding time of the picture are stored.

Figure 22:
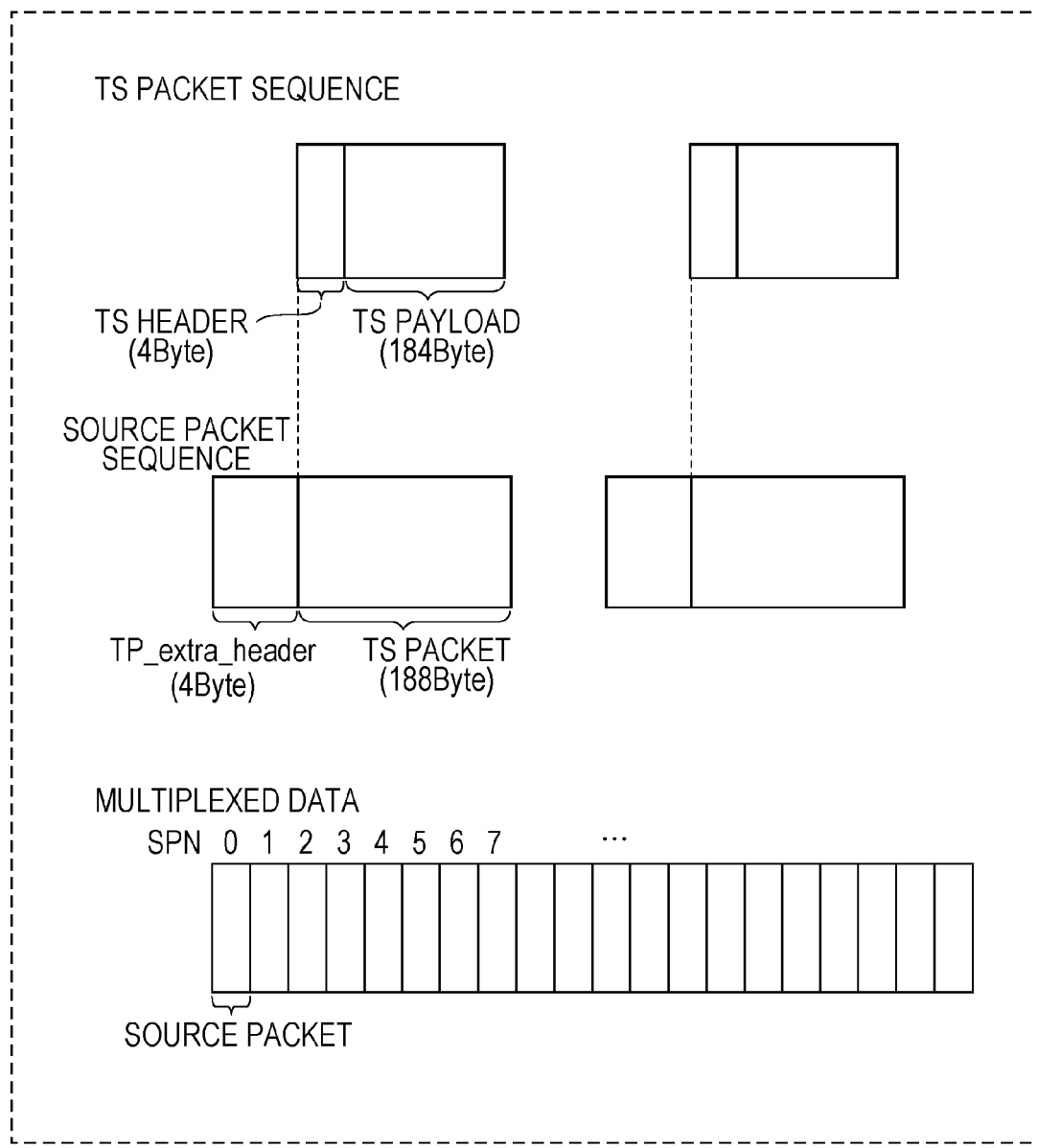
FIG. 22 is a diagram illustrating structures of a TS (Transport Stream) packet and a source packet in multiplexed data.

FIG. 22 illustrates the format of TS packets which are ultimately written in multiplexed data. A TS packet is a 188-byte fixed-length packet made up of a 4-byte TS header which includes information such as PID for identifying a stream, and a 184-byte TS payload which stores data. A PES packet is divided into portions, and these portions are stored in respective TS payloads. In the case of BD-ROM, a TS packet is attached with a 4-byte TP_Extra_Header to form a 192-byte source packet, and the source packet is written in the multiplexed data. The TP_Extra_Header includes information such as ATS (Arrival_Time_ The ATS represents the transfer start time at which transfer of the TS packet to a PID filter of a decoder is to be started. As illustrated by the lowest row in FIG. 22, source packets are arranged in the multiplexed data. The number that is incremented from the start of the multiplexed data is called SPN (Source Packet Number).

TS packets included in the multiplexed data include a PAT (Program Association Table), a PMT (Program Map Table), and a PCR (Program Clock Reference) in addition to individual streams of video, audio, subtitle, and so forth. The PAT represents the PID of the PMT used in the multiplexed data; and 0 is registered as the PID of the PAT. The PMT includes PIDs of individual streams of video, audio, subtitle, and so forth included in the multiplexed data; pieces of attribute information of the streams corresponding to the individual PIDs; and various descriptors regarding the multiplexed data. Examples of the descriptors include copy control information that indicates whether or not copying of the multiplexed data is permitted. The PCR includes information regarding STC (System Time Clock) time corresponding to the ATS at which the PCR packet is transferred to a decoder in order to achieve synchronization between ATC (Arrival Time Clock) which is the time axis for ATS and STC (System Time Clock) which is the time axis for PTS and DTS.

Figure 23:
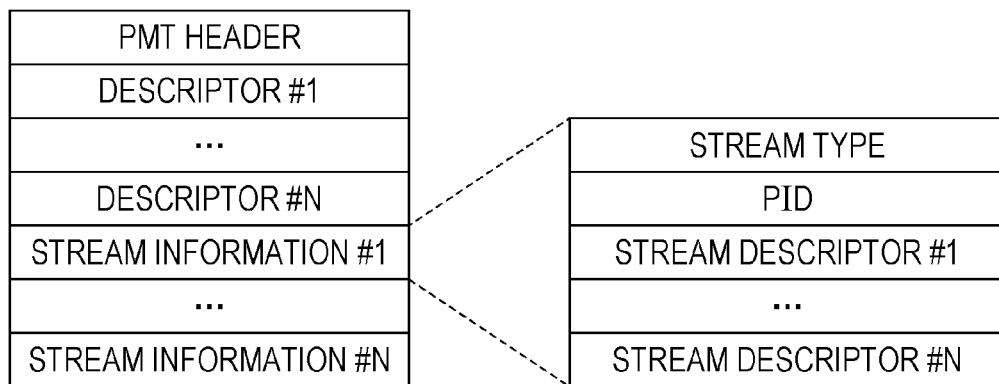
FIG. 23 is a diagram illustrating a data structure of a PMT (Program Map Table)

FIG. 23 is a diagram that describes the data structure of the PMT in detail. At the start of the PMT, a PMT header which describes the length of data included in the PMT is placed. The PMT header is followed by a plurality of descriptors regarding the multiplexed data. The copy control information and so forth are described as the descriptors. The descriptors are followed by a plurality of pieces of stream information regarding individual streams included in the multiplexed data. The stream information is made up of a stream type for identifying the compression codec of the stream or the like, the PID of the stream, and stream descriptors that describe the attribute information (such as a frame rate and an aspect ratio) of the stream. The PMT includes as many stream descriptors as the number of streams included in the multiplexed data.

In the case where the multiplexed data is recorded on a recording medium or the like, the multiplexed data is recorded together with a multiplexed data information file.

Figure 24:
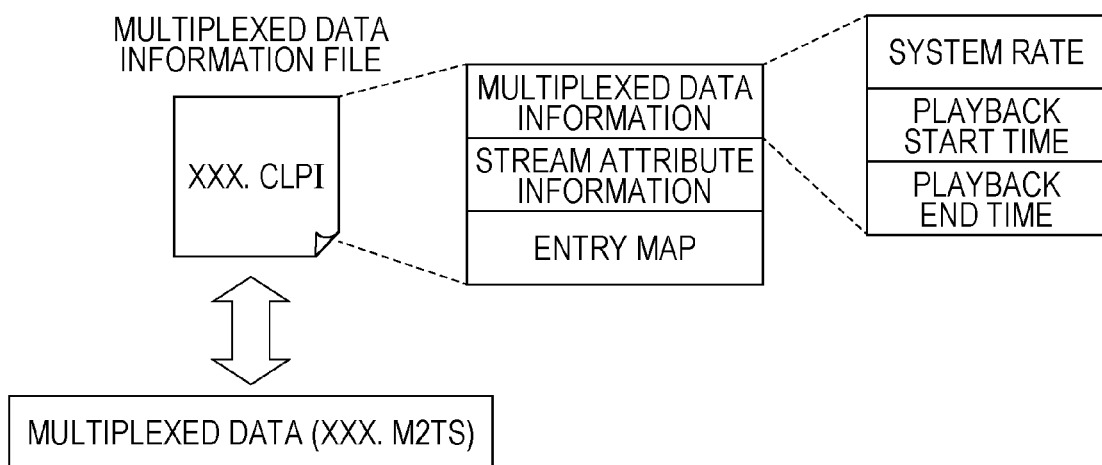
FIG. 24 is a diagram illustrating an internal structure of multiplexed data information.

As illustrated in FIG. 24, a multiplexed data information file (clip information file) contains management information of the multiplexed data, has one-to-one correspondence with the multiplexed data, and is made up of multiplexed data information (clip information), stream attribute information, and an entry map.

The multiplexed data information (clip information) is made up of the system rate, the playback start time, and the playback end time as illustrated in FIG. 24. The system rate represents the maximum transfer rate at which the multiplexed data is transferred to the PID filter of a system target decoder (described later). Intervals of the ATS included in the multiplexed data are set to be lower than or equal to the system rate. The playback start time represents the PTS of the first video frame of the multiplexed data. As the playback end time, a result obtained by adding a playback duration of one frame to the PTS of the last video frame of the multiplexed data is set.

Figure 25:
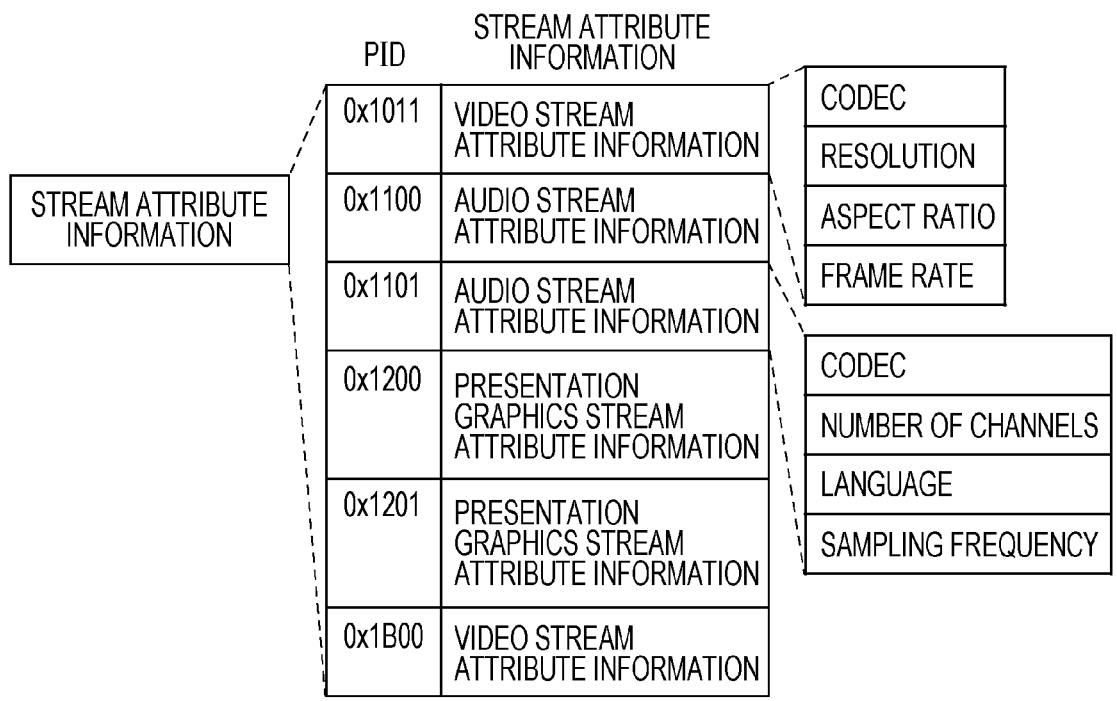
FIG. 25 is a diagram illustrating an internal structure of stream attribute information.

For each PID, attribute information of a corresponding stream included in the multiplexed data is registered in the stream attribute information as illustrated in FIG. 25. The attribute information has different pieces of information for the video stream, the audio stream, the presentation graphics stream, and the interactive graphics stream. Video stream attribute information includes pieces of information such as those regarding a compression codec used to compress the video stream, a resolution of individual picture data of the video stream, an aspect ratio, and a frame rate. Audio stream attribute information includes pieces of information such as those regarding a compression codec used to compress the audio stream, the number of channels included in the audio stream, a supported language, and a sampling frequency. These pieces of information are used in initialization of the decoder before a player performs reproduction, for example.

In the present exemplary embodiment, the stream type contained in the PMT is used among the multiplexed data. Also, in the case where the multiplexed data is recorded on a recording medium, the video stream attribute information contained in the multiplexed data information is used. Specifically, the video coding method or apparatus described in each of the above exemplary embodiments includes a step or unit for setting unique information which indicates whether or not this video data has been generated by the video coding method or apparatus described in each of the above exemplary embodiments, in the stream type contained in the PMT or the video stream attribute information. With this configuration, video data generated using the video coding method or apparatus described in each of the above exemplary embodiments and video data based on another standard can be distinguished from each other.

Figure 26:
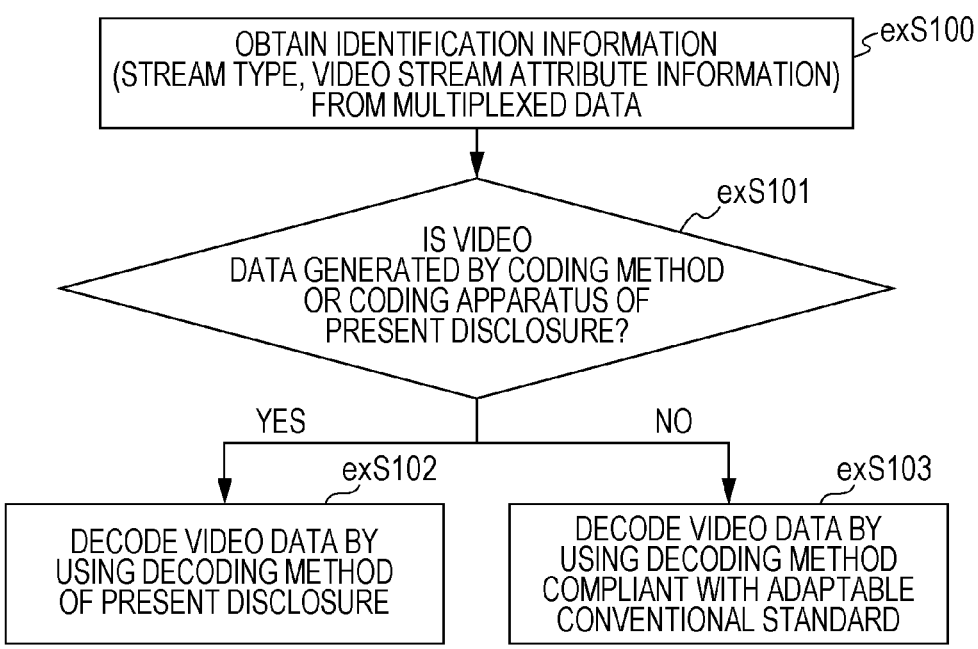
FIG. 26 is a diagram illustrating steps for identifying video data.

FIG. 26 illustrates steps included in a video decoding method in accordance with the present exemplary embodiment. In step exS100, the stream type contained in the PMT or the video stream attribute information contained in the multiplexed data information is obtained from the multiplexed data. Then, in step exS101, it is determined whether or not the stream type or the video stream attribute information indicates that this multiplexed data is data that has been generated using the video coding method or apparatus described in each of the above exemplary embodiments. If it is determined from the stream type or the video stream attribute information that this multiplexed data has been generated using the video coding method or apparatus described in each of the above exemplary embodiments, decoding is performed using the video decoding method described in each of the above exemplary embodiments in step exS102. If the stream type or the video stream attribute information indicates that the multiplexed data is based on an existing standard, such as MPEG-2, MPEG-4 AVC, or VC-1, decoding is performed using a video decoding method based on the existing standard in step exS103.

By setting a new unique value in the steam type or the video stream attribute information in this way, it can be determined whether or not decoding can be performed using the video decoding method or apparatus described in each of the above exemplary embodiments at the time of decoding. Accordingly, even in the case where multiplexed data based on a different standard is input, an appropriate decoding method or apparatus can be selected, and thus decoding can be performed without causing an error. Also, the video coding method or apparatus or the video decoding method or apparatus described in the present exemplary embodiment is applicable to any of the aforementioned devices and systems.

Fifth Exemplary Embodiment

Figure 27:
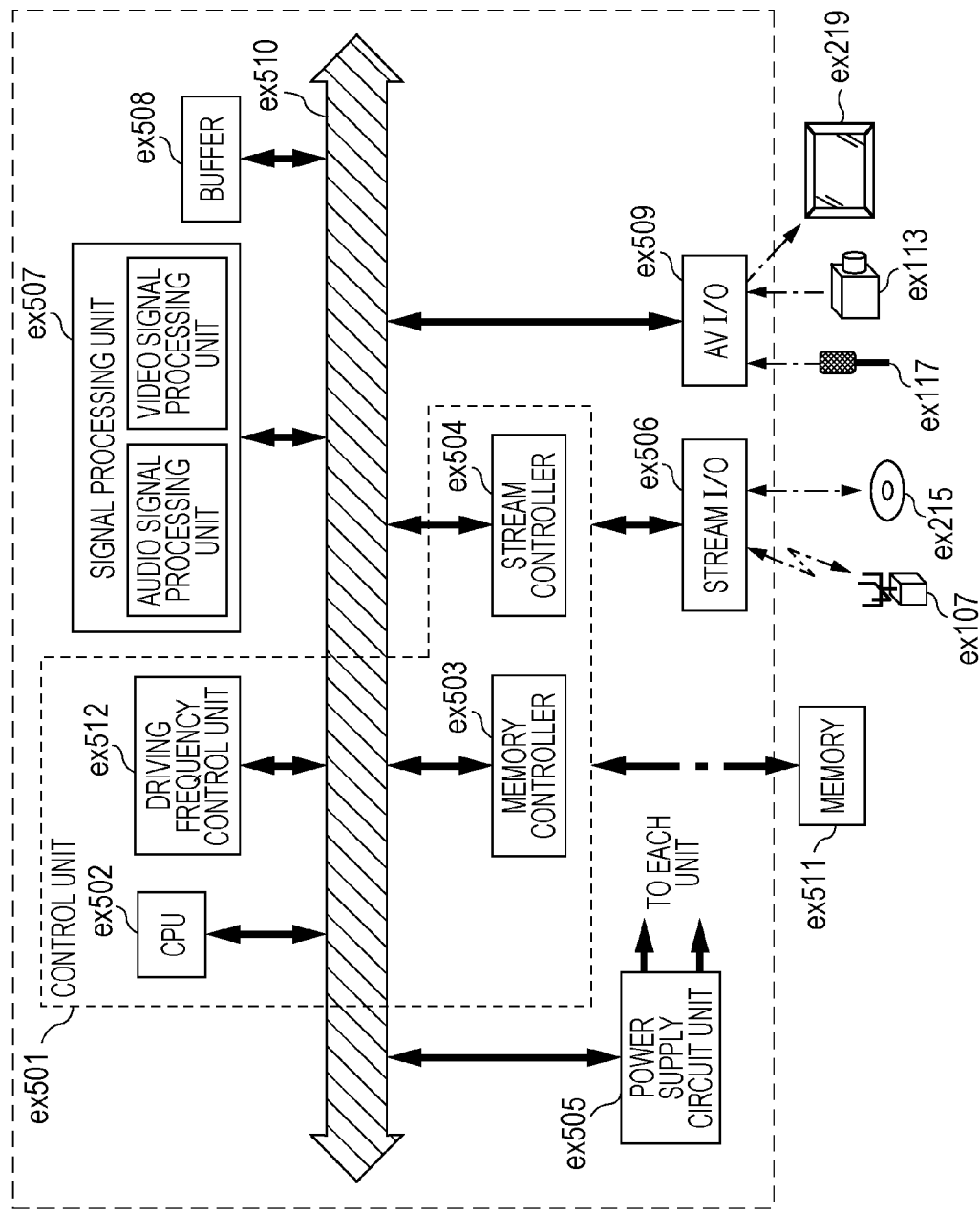
FIG. 27 is a block diagram illustrating an example of a configuration of an integrated circuit that implements a video coding method and a video decoding method according to each of the exemplary embodiments.

The video coding method and apparatus and the video decoding method and apparatus described in each of the above exemplary embodiments are typically implemented using an LSI which is an integrated circuit. FIG. 27 illustrates an example of a configuration of LSI ex500 which is formed as one chip. LSI ex500 includes control unit ex501, CPU ex502, memory controller ex503, stream controller ex504, power supply circuit unit ex505, stream input/output (I/O) ex506, signal processing unit ex507, buffer ex508, and audio/video (AV) I/O ex509, which are connected to one another via bus ex510. Upon power-on, power supply circuit unit ex505 supplies electric power to the individual units to activate the individual units into an operable state.

For example, in the case of performing a coding process, LSI ex500 receives an AV signal from microphone ex117, camera ex113, or the like via AV I/O ex509 in accordance with control performed by control unit ex501 which includes CPU ex502, memory controller ex503, stream controller ex504, and driving frequency control unit ex512. The input AV signal is temporarily stored in external memory ex511, such as an SDRAM (Synchronous Dynamic Random Access Memory). In accordance with control performed by control unit ex501, the stored data is divided into a plurality of portions in accordance with an amount of processing or a processing speed, and the plurality of portions are sent to signal processing unit ex507. Then, signal processing unit ex507 codes the audio signal and/or the video signal. The coding process performed on the video signal here is the coding process described in each of the above exemplary embodiments. Signal processing unit ex507 performs processing such as multiplexing of the coded audio data and the coded video data depending on circumstances, and outputs the multiplexed data to outside via stream I/O ex506. This output multiplexed data is transmitted to base station ex107 or written to recording medium ex215. Note that the audio data and the video data may be temporarily stored in buffer ex508 at the time of multiplexing so that these pieces of data are synchronized with each other.

Note that although memory ex511 has been described as a device provided outside LSI ex500 above, memory ex511 may be included in LSI ex500. The number of buffers ex508 is not limited to one and LSI ex500 may include a plurality of buffers. Also, LSI ex500 may be formed as a single chip or a plurality of chips.

Although control unit ex501 includes CPU ex502, memory controller ex503, stream controller ex504, and driving frequency control unit ex512 above, the configuration of control unit ex501 is not limited to this one. For example, signal processing unit ex507 may further include a CPU. By providing a CPU within signal processing unit ex507, the processing speed can be further improved. Alternatively, CPU ex502 may include signal processing unit ex507 or, for example, an audio signal processing unit which is part of signal processing unit ex507. In such a case, control unit ex501 includes CPU ex502 which includes signal processing unit ex507 or part of signal processing unit ex507.

Note that the term "LSI" is used here; however, the configuration may be referred to as an IC, a system LSI, a super LSI, or an ultra LSI depending on the degree of integration.

Also, the circuit integration technique is not limited to LSI, and circuit integration may be implemented using a dedicated circuit or general-purpose processor. An FPGA (Field Programmable Gate Array) that is programmable after manufacturing of an LSI or a reconfigurable processor in which connections and settings of circuit cells within the LSI are reconfigurable may be used. Such a programmable logic device can execute the video coding method or the video decoding method described in each of the above exemplary embodiments typically by loading or reading from a memory or the like a program constituting software or firmware.

Furthermore, if an advance in the semiconductor technology or another related technology yields a circuit integration technology that may substitute for LSI, the functional blocks may be integrated using such a technology obviously. Adaptation of the biotechnology may be possible.

Sixth Exemplary Embodiment

It is considered that an amount of processing increases in the case of decoding video data generated using the video coding method or apparatus described in each of the above exemplary embodiments, compared with the case of decoding video data based on an existing standard, such as MPEG-2, MPEG-4 AVC, or VC-1. Accordingly, in LSI ex500, a higher driving frequency needs to be set in CPU ex502 than that used when video data based on an existing standard is decoded. However, making the driving frequency higher undesirably increases power consumption.

Figure 28:
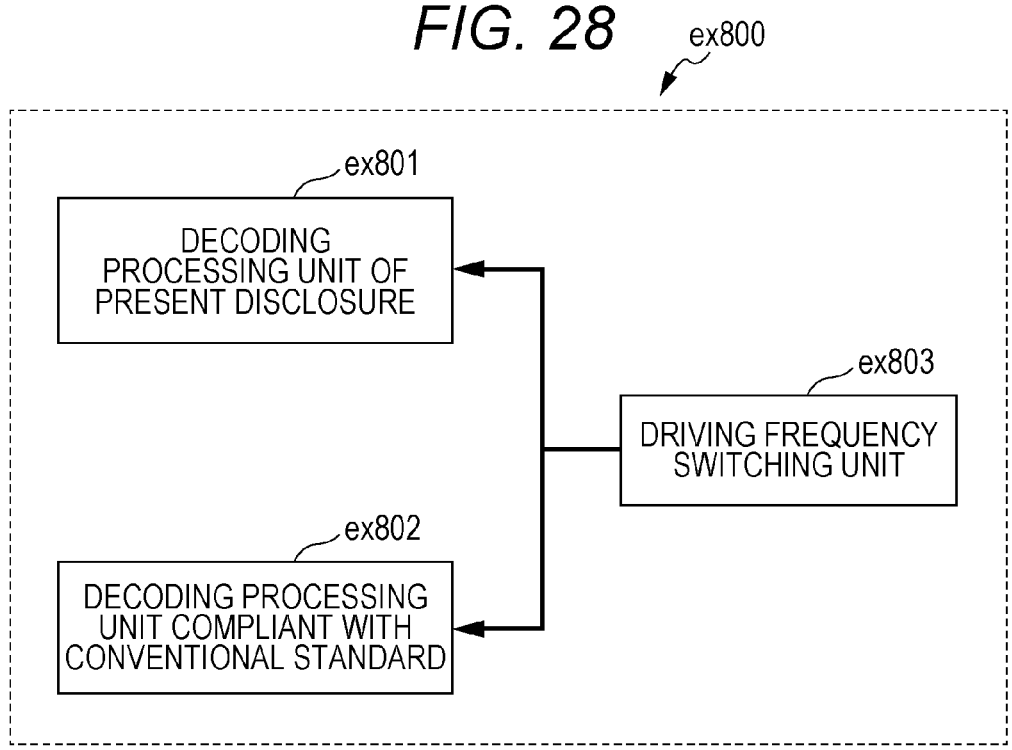
FIG. 28 is a diagram illustrating a configuration for switching between driving frequencies.

To address this issue, the video decoding apparatus, such as television ex300 or LSI ex500, is configured to identify a standard which video data is based on, and to switch between the driving frequencies in accordance with the standard. FIG. 28 illustrates configuration ex800 in accordance with the present exemplary embodiment. Driving frequency switching unit ex803 sets the driving frequency high in the case where video data is data that has been generated using the video coding method or apparatus described in each of the above exemplary embodiments. Driving frequency switching unit ex803 also instructs decoding processing unit ex801 which executes the video decoding method described in each of the above exemplary embodiments to decode the video data. On the other hand, in the case where the video data is data based on an existing standard, driving frequency switching unit ex803 sets the driving frequency lower than that of the case where the video data is data that has been generated using the video coding method or apparatus described in each of the above exemplary embodiments. Then, driving frequency switching unit ex803 instructs decoding processing unit ex802 compliant with the existing standard to decode the video data.

More specifically, driving frequency switching unit ex803 includes CPU ex502 and driving frequency control unit ex512 illustrated in FIG. 27. Decoding processing unit ex801 that executes the video decoding method described in each of the above exemplary embodiments and decoding processing unit ex802 compliant with an existing standard correspond to signal processing unit ex507 illustrated in FIG. 27. CPU ex502 identifies a standard which video data is based on. Then, based on a signal from CPU ex502, driving frequency control unit ex512 sets the driving frequency. Also, based on a signal from CPU ex502, signal processing unit ex507 decodes the video data. Here, the use of the identification information described in the fourth exemplary embodiment, for example, in identification of the video data is conceivable. The identification information is not limited to the one described in the fourth exemplary embodiment and may be any type of information with which a standard which the video data is based on is identifiable. For example, in the case where a standard which video data is based on is identifiable on the basis of an external signal that identifies whether the video data is used for the television or for a disc, the identification can be made on the basis of such an external signal. It is also conceivable to select the driving frequency of CPU ex502 in accordance with a lookup table in which the standard for the video data and the driving frequency are associated with each other as illustrated in FIG. 30, for example. The lookup table is stored in buffer ex508 or an internal memory of LSI ex500, and CPU ex502 refers to this lookup table. In this way, the driving frequency can be selected.

Figure 29:
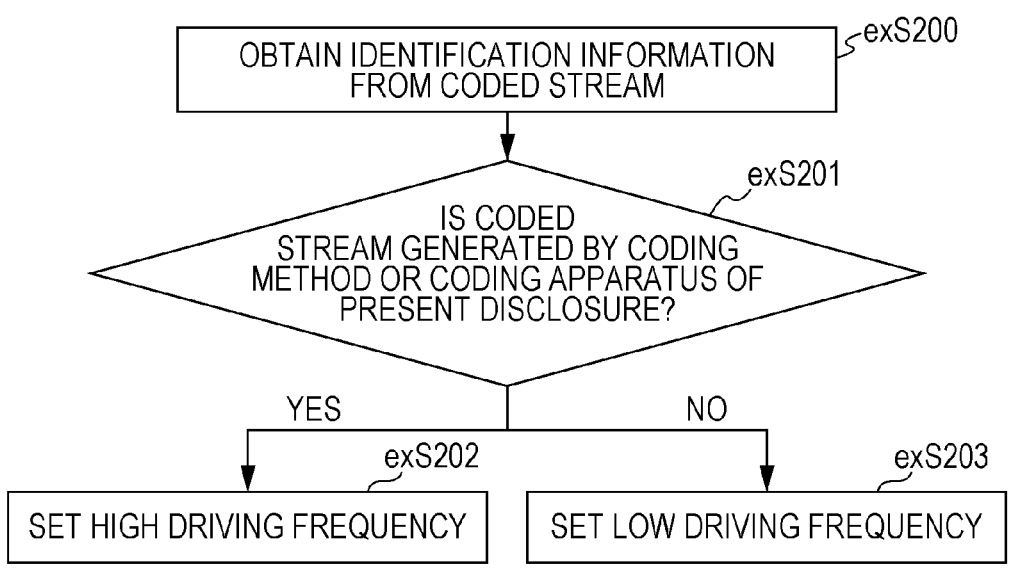
FIG. 29 is a diagram illustrating steps for identifying video data and switching between driving frequencies.

FIG. 29 illustrates steps for performing the method according to the present exemplary embodiment. First, in step exS200, signal processing unit ex507 obtains identification information from multiplexed data. Then, in step exS201, based on the identification information, CPU ex502 identifies whether or not video data is video data that has been generated using the video coding method or apparatus described in each of the above exemplary embodiments. If the video data is video data that has been generated using the video coding method or apparatus described in each of the above exemplary embodiments; CPU ex502 sends a signal for setting a high driving frequency to driving frequency control unit ex512 in step exS202. Then, driving frequency control unit ex512 sets a high driving frequency. On the other hand, if the identification information indicates that the video data is video data based on an existing standard, such as MPEG-2, MPEG-4 AVC, or VC-1, CPU ex502 sends a signal for setting a low driving frequency to driving frequency control unit ex512 in step exS203. Then, driving frequency control unit ex512 sets a lower driving frequency than that used when the video data is video data that has been generated using the video coding method or apparatus described in each of the above exemplary embodiments.

Further, by changing a voltage supplied to LSI ex500 or an apparatus including LSI ex500 in conjunction with switching of the driving frequency, the power-saving effect can be further increased. For example, it is conceivable that in the case where a low driving frequency is set, a voltage supplied to LSI ex500 or an apparatus including LSI ex500 is set to be lower in response to this setting than that of the case where a high driving frequency is set.

It is sufficient that the driving frequency is set to be higher in the case where an amount of decoding processing is large and set to be lower in the case where an amount of decoding processing is small. Accordingly, the driving frequency setting method is not limited to the above-described setting method. For example, in the case where an amount of processing for decoding video data based on the MPEG-4 AVC standard is larger than an amount of processing for decoding video data generated using the video coding method or apparatus described in each of the above exemplary embodiments, settings of the driving frequency can be made opposite to the settings of the above-described case.

Further, the driving frequency setting method is not limited to a configuration for setting the driving frequency low. For example, in the case where the identification information indicates that the video data is video data that has been generated using the video coding method or apparatus described in each of the above exemplary embodiments, a voltage supplied to LSI ex500 or an apparatus including LSI ex500 may be set to be high. In the case where the identification information indicates that the video data is video data based on an existing standard, such as MPEG-2, MPEG-4 AVC, or VC-1, a voltage supplied to LSI ex500 or an apparatus including LSIex500 may be set to be low. Alternatively, in another example, in the case where the identification information indicates that the video data is video data that has been generated using the video coding method or apparatus described in each of the above exemplary embodiments, driving of CPU ex502 is not stopped. In the case where the identification information indicates that the video data is video data based on an existing standard, such as MPEG-2, MPEG-4 AVC, or VC-1, driving of CPU ex502 may be temporarily stopped because there is a surplus of capacity relative to the processing load. When there is a surplus of capacity relative to the processing load in the case where the identification information indicates that the video data is video data that has been generated using the video coding method or apparatus described in each of the above exemplary embodiments, driving of CPU ex502 may be temporarily stopped. In this case, a period over which CPU ex502 is stopped may be set to be shorter than that of the case where the identification information indicates that the video data is video data based on an existing standard, such as MPEG-2, MPEG-4 AVC, or VC-1.

By switching between the driving frequencies in accordance with the standard which the video data is based on in this manner, electric power can be saved. Also, in the case where LSI ex500 or an apparatus including LSI ex500 is driven with a battery, the battery can be made last longer as a result of power-saving.

Seventh Exemplary Embodiment

A plurality of pieces of video data based on different standards are sometimes input to the aforementioned devices and systems, such as television ex300 and mobile phone ex114, In order to enable decoding even in the case where a plurality of pieces of video data based on different standards are input, signal processing unit ex507 of LSI ex500 needs to support the plurality of standards. However, the use of signal processing units ex507 for the respective standards undesirably makes the circuit scale of LSI ex500 larger and increases the cost.

Figure 31A:
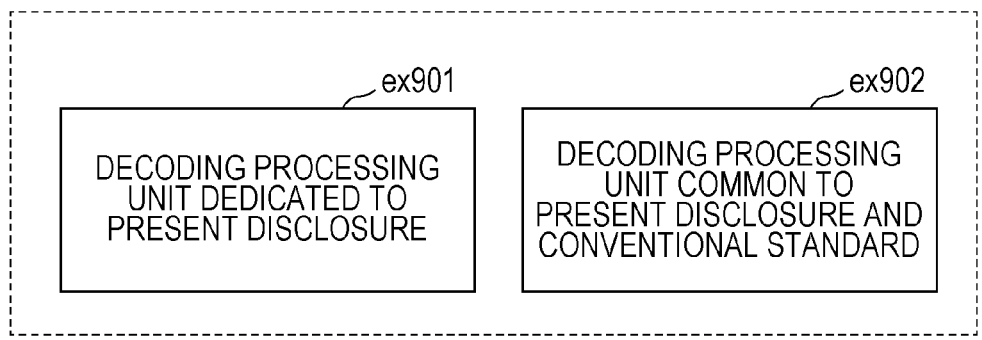
FIG. 31A is a diagram illustrating an example of a configuration that enables sharing of modules among signal processing units.

To address this issue, a decoding processing unit that executes the video decoding method described in each of the above embodiments and a decoding processing unit compliant with an existing standard, such as MPEG-2, MPEG-4 AVC, or VC-1, share some of their components. FIG. 31A illustrates an example of this configuration ex900. For example, the video decoding method described in each of the above exemplary embodiments and the video decoding method compliant with the MPEG-4 AVC standard share some of contents of processing, such as entropy decoding, inverse quantization, deblocking filtering, and motion compensation. Accordingly, the following configuration is conceivable. For the shared processing contents, decoding processing unit ex902 compliant with the MPEG-4 AVC standard in used in common. For other processing contents that are not compliant with the MPEG-4 AVC standard and are unique to an aspect of the present invention, dedicated decoding processing unit ex901 may be used. In particular, an aspect of the present invention includes a feature in switching of the processing scheme. Thus, for example, dedicated decoding processing unit ex901 may be used for switching of the processing scheme and decoding processing unit ex902 may be used in common for any of or all of entropy decoding, inverse quantization, deblocking filtering and motion compensation. Alternatively, as for sharing of the decoding processing unit, a configuration may be used in which a decoding processing unit that executes the video decoding method described in each of the above embodiments is used for the common processing contents and a dedicated decoding processing unit is used for processing contents unique to the MPEG-4 AVC standard.

Figure 31B:
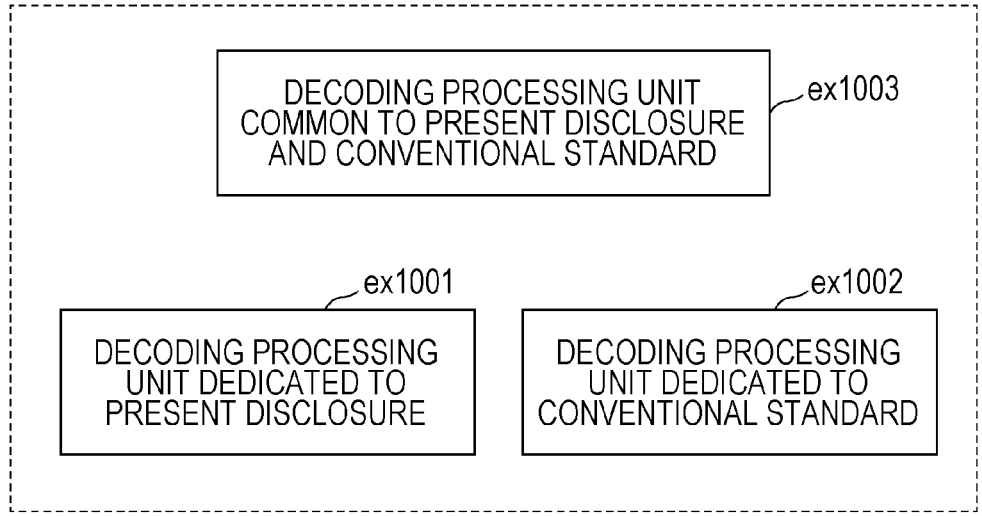
FIG. 31B is a diagram illustrating another example of a configuration that enables sharing of modules among signal processing units.

FIG. 31B illustrates another example ex1000 that implements sharing of part of processing. In this example, dedicated decoding processing unit ex1001 that handles processing contents unique to an aspect of the present invention, dedicated decoding processing unit ex1002 that handles processing contents unique to an existing standard, and shared decoding processing unit ex1003 that handles processing contents that are common to the video decoding method according to the aspect of the present invention and the video decoding method according to the existing standard are used. Here, dedicated decoding processing units ex1001 and ex1002 are not necessarily specialized for the processing contents unique to the aspect of the present invention and the existing standard, respectively, and may be also capable of executing other general processing. Also, the configuration according to the present exemplary embodiment can be implemented using LSI ex500.

By sharing a decoding processing unit for processing contents that are common to the video decoding method according to an aspect of the present invention and the video decoding method according to an existing standard, the circuit scale and cost of LSI ex500 can be reduced.

The present invention can be used for various applications, such as accumulation, transmission, and communication. For example, the present invention can be used for high-resolution information display devices or image pickup devices, such as a television, digital video recorder, car navigation system, cellular phone, digital camera, and digital camcorder.

What is claimed is:

1. An image coding and decoding method for coding an image on a block-by-block basis and for decoding a bitstream obtained through the coding of the image on the block-by-block basis, the image coding and decoding method comprising:

coding a first flag that indicates whether a predetermined extension standard of a predetermined image coding standard is used;

coding, when the first flag indicates that the extension standard is used, a second flag that indicates whether a first scheme is used for coding a current block to be coded included in the image, the first scheme being included in the extension standard;

coding, when the first flag indicates that the extension standard is used, a third flag that indicates whether a third scheme is used for coding the image, the third scheme being included in the extension standard;

performing prediction on the current block to generate a residual signal, the residual signal indicating a difference between the current block and the predicted current block;

coding, when the second flag indicates that the first scheme is used, the current block by coding a difference between adjacent-to-each-other samples of the current block using the first scheme, the samples being obtained from the residual signal;

coding, when the third flag indicates that the third scheme is used, the image using the third scheme;

decoding, from the bitstream, the first flag that indicates whether the predetermined extension standard of the image coding standard is used;

decoding, from the bitstream, when the first flag indicates that the extension standard is used, the second flag that indicates whether the first scheme is used;

decoding, from the bitstream, when the first flag indicates that the extension standard is used, the third flag that indicates whether the third scheme is used;

decoding the residual signal of the current block that indicates the difference between the current block and the predicted current block;

decoding, from the bitstream, when the second flag indicates that the first scheme is used, the current block by decoding, from the bitstream, the difference between the adjacent-to-each-other samples of the current block using the first scheme; and decoding, from the bitstream, when the third flag indicates that the third scheme is used, the image using the third scheme, wherein the second flag and the third flag are included in headers of different layers, with the first flag corresponding to each of the second flag and the third flag and being included in each of the headers.

2. The image coding and decoding method according to claim 1, wherein the second flag is written in and decoded from a header of a sequence, the sequence including a plurality of pictures.

3. The image coding and decoding method according to claim 1, wherein, when the second flag indicates that the first scheme is not used and the third flag indicates that the third scheme is not used:

the image is coded by using a second scheme for coding the residual signal of the current block, the second scheme being included in the image coding standard; and the image is decoded from the bitstream by a decoding scheme for decoding a signal coded by the second scheme.

4. The image coding and decoding method according to claim 1, wherein the third scheme is for predicting a color residual signal from a luminance signal.

5. The image coding and decoding method according to claim 4, wherein the third flag is written in and decoded from a header of a picture.

6. An image coding and decoding apparatus configured to code an image and decode a bitstream obtained through the coding of the image, the image coding and decoding apparatus comprising:

a processor; and a non-transitory computer-readable recording medium storing a program configured to be executed by the processor, wherein, when the program is executed by the processor, the processor executes the image coding and decoding method according to claim 1.

7. An image coding method for coding an image on a block-by-block basis, the image coding method comprising:

coding a first flag that indicates whether a predetermined extension standard of a predetermined image coding standard is used;

coding, when the first flag indicates that the extension standard is used, a second flag that indicates whether a first scheme is used for coding a current block to be coded included in the image, the first scheme being included in the extension standard;

performing prediction on the current block to generate a residual signal, the residual signal indicating a difference between the current block and the predicted current block;

coding, when the first flag indicates that the extension standard is not used, the current block by coding a residual signal of the current block using a second scheme;

coding, when the first flag indicates that the extension standard is used and the second flag indicates that the first scheme is used, the current block by coding a difference between adjacent-to-each-other samples of the current block using the first scheme, the samples being obtained from the residual signal; and coding, when the first flag indicates that the extension standard is used and the second flag indicates that the first scheme is not used, the current block by coding a residual signal of the current block using a second scheme.

8. An image decoding method for decoding a bitstream obtained through coding of an image on a block-by-block basis, the image decoding method comprising:

decoding, from the bitstream, a first flag that indicates whether a predetermined extension standard of a predetermined image coding standard is used;

decoding, from the bitstream, when the first flag indicates that the extension standard is used, a second flag that indicates whether a first scheme is used for coding a current block to be coded included in the image, the first scheme being included in the extension standard;

decoding a residual signal of the current block that indicates a difference between the current block and a predicted current block;

decoding, from the bitstream, when the first flag indicates that the extension standard is not used, the current block by coding the residual signal of the current block using a second scheme;

decoding, from the bitstream, when the first flag indicates that the extension standard is used and the second flag indicates that the first scheme is used, the current block by coding a difference between adjacent-to-each-other samples of the current block using the first scheme, the samples being obtained from the residual signal; and decoding, from the bitstream, when the first flag indicates that the extension standard is used and the second flag indicates that the first scheme is not used, the current block by coding a residual signal of the current block using a second scheme.

* * * * *